(12) United States Patent
Park et al.

(10) Patent No.: US 12,527,762 B2
(45) Date of Patent: Jan. 20, 2026

(54) COCRYSTAL COMPRISING CAMOSTAT AND NICLOSAMIDE, PHARMACEUTICAL COMPOSITION COMPRISING SAME AND PREPARATION METHOD THEREFOR

(71) Applicant: IMDPHARM INC., Suwon-si (KR)

(72) Inventors: Young Joon Park, Seoul (KR); Sook Choi, Seoul (KR); Ga Haeng Lee, Seoul (KR); Dong Hyun Roh, Suwon-si (KR)

(73) Assignee: IMDPHARM INC., Suwon-si Gyeonggi-do (KR)

( * ) Notice: Subject to any disclaimer, the term of this patent is extended or adjusted under 35 U.S.C. 154(b) by 282 days.

(21) Appl. No.: 18/007,153

(22) PCT Filed: Jan. 28, 2022

(86) PCT No.: PCT/IB2022/050754
§ 371 (c)(1),
(2) Date: Jan. 27, 2023

(87) PCT Pub. No.: WO2022/162604
PCT Pub. Date: Aug. 4, 2022

(65) Prior Publication Data
US 2023/0233502 A1 Jul. 27, 2023

(30) Foreign Application Priority Data
Jan. 28, 2021 (KR) ........................ 10-2021-0012681

(51) Int. Cl.
*A61K 31/245* (2006.01)
*A61K 31/167* (2006.01)
*A61P 31/14* (2006.01)

(52) U.S. Cl.
CPC .......... *A61K 31/245* (2013.01); *A61K 31/167* (2013.01); *A61P 31/14* (2018.01)

(58) Field of Classification Search
CPC .......... A61P 29/00; A61P 31/12; A61P 31/14; A61P 35/00; A61K 31/167; A61K 31/192; A61K 31/24; A61K 31/245; A61K 31/455; A61K 9/14; A61K 2300/00; A61K 47/55; C07C 235/56; C07C 279/18; C07C 235/64; C07C 277/06
See application file for complete search history.

(56) References Cited

U.S. PATENT DOCUMENTS 11,045,434 B1 * 6/2021 Sommer .............. A61K 9/0053

FOREIGN PATENT DOCUMENTS

| CN | 109562137 A | 4/2019 | |
|---|---|---|---|
| EP | 3 168 211 A1 | 11/2015 | |
| JP | 2015-91773 A | 5/2015 | |
| JP | 2017-530961 A | 10/2017 | |
| JP | 2018-529762 A | 10/2018 | |
| KR | 10-2018-0080189 A | 7/2018 | |
| WO | 2012/143377 A1 | 10/2012 | |
| WO | WO-2017040864 A1 * | 3/2017 | .............. A61P 37/06 |
| WO | 2021/205298 A1 | 10/2021 | |

OTHER PUBLICATIONS

Johnson et al., (British J. of Cancer 2001) (Year: 2001).*
Gura et al. (Science 1997) (Year: 1997).*
International Search Report dated May 2, 2022 in International Application No. PCT/IB2022/050754.
Ko, M et al., "Comparative analysis of antiviral efficacy of FDA-approved drugs against SARS-CoV-2 in human lung cells," Journal of Medical Virology, 2021, 93:1403-1408, 2020 Wiley Periodicals LLC.
Manabe, T. et al., "Effect of Synthetic Protease Inhibitor on Histologic Changes and Free Radical Activity in Hamsters with Pancreatic Cancer," Scand J Gastroenterol., 1993, 28:719-724.
Oct. 12, 2020. non-official translation ('Treatment of COVID-19 with a Single Injection of Anthelmintic' . . . Daewoong Pharmaceutical Co., Ltd., "Niclosamide" Treatment that Resolves Side Effects has Entered Clinical Trials in Korea). [Retrieved on Apr. 15, 2022]. Retrieved from <URL: https://www.donga.com/news/article/all/20201012/103356598/1>.
Office Action dated May 12, 2025 in Chinese Application No. 202280006162.9.
Notice of Allowance dated Aug. 12, 2025 in Japanese Application No. 2023-506291.
Office Action dated Jul. 16, 2025 in Japanese Application No. 2023-506291.

* cited by examiner

*Primary Examiner* — Umamaheswari Ramachandran
(74) *Attorney, Agent, or Firm* — SALIWANCHIK, LLOYD & EISENSCHENK

(57) ABSTRACT

The present invention relates to a novel cocrystal, a pharmaceutical composition comprising same and a preparation method therefor. By using the cocrystal of the present invention, cancers, inflammatory diseases, or viral infection diseases may be effectively prevented and/or treated.

8 Claims, 4 Drawing Sheets

COCRYSTAL COMPRISING CAMOSTAT AND NICLOSAMIDE, PHARMACEUTICAL COMPOSITION COMPRISING SAME AND PREPARATION METHOD THEREFOR

CROSS-REFERENCE TO RELATED APPLICATIONS

This application is the U.S. national stage application of International Patent Application No. PCT/IB2022/050754, filed Jan. 28, 2022, which claims the benefit under 35 U.S.C. § 119 of Korean Application No. 10-2021-0012681, filed Jan. 28, 2021, the disclosures of each of which are incorporated herein by reference in their entirety.

TECHNICAL FIELD

The present invention relates to a cocrystal comprising camostat or a pharmaceutically acceptable salt thereof, and niclosamide; or a cocrystal comprising camostat or a pharmaceutically acceptable salt thereof, niclosamide and a co-former; a pharmaceutical composition including the same and a preparation method therefor.

BACKGROUND ART

A cocrystal (or co-crystal) means a form in which two or more different molecules form a crystal structure at a constant stoichiometric ratio in one crystal lattice. Different molecules in the cocrystal, two or more drugs or a drug and a co-former may form a crystal structure in one crystal lattice, and is distinguished from a binding form of a salt and a mixture by being bound by methods such as hydrogen bond, van der waals interaction, or n-n stacking interaction.

Although cocrystals have already been known, overall research is insufficient to the extent of less than 1% of general organic compounds.

Camostat is a drug represented by Chemical Formula 1 below, and camostat mesylate as a salt thereof is a drug represented by Chemical Formula 2 below. The drugs are known to have potential antiviral and anticancer effects, as well as being used as a pancreatitis therapeutic agent as an anticoagulant. Recently, camostat inhibits the activity of TMPRSS2 on the cell surface, and for example, is reported to be a useful compound for the treatment and prevention of coronavirus disease 2019 (COVID-19), which requires S protein priming of TMPRSS2.

[Chemical Formula 1]

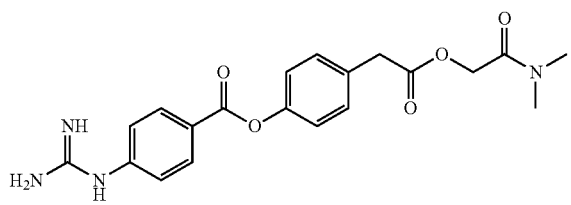

[Chemical Formula 2]

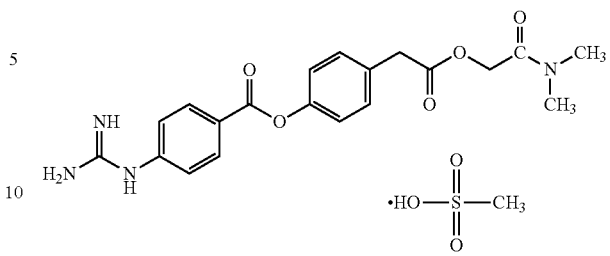

Niclosamide is a drug represented by Chemical Formula 3 below.

[Chemical Formula 3]

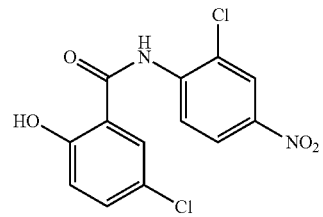

Since the niclosamide has very low water solubility and intestinal permeability and extremely low bioavailability, an excessive amount of niclosamide has been prescribed by oral administration, but it is difficult to expect a drug effect due to systemic exposure of the drug fundamentally by the characteristics of niclosamide itself. In particular, due to low solubility, there is a limit to obtaining their treatment or improvement effects.

PRIOR ARTS (Non-Patent Document 0001) Ko, M., Jeon, S., Ryu, W. S., & Kim, S. (Aug. 7, 2020). Comparative analysis of antiviral efficacy of FDA-approved drugs against SARS-CoV-2 in human lung cells. Journal of medical virology.

DISCLOSURE

Technical Problem

The present invention provides a cocrystal comprising camostat or a pharmaceutically acceptable salt thereof, and niclosamide; a pharmaceutical composition including the same and a preparation method therefor.

The present invention provides a pharmaceutical composition for the prevention or treatment of cancers, inflammatory diseases or viral infection diseases, including a cocrystal comprising camostat or a pharmaceutically acceptable salt thereof, and niclosamide.

The present invention provides a method for the prevention or treatment of cancers, inflammatory diseases or viral infection diseases, including administering a cocrystal comprising camostat or a pharmaceutically acceptable salt thereof, and niclosamide to a subject.

The present invention provides a use of a cocrystal comprising camostat or a pharmaceutically acceptable salt thereof, and niclosamide for the prevention or treatment of cancers, inflammatory diseases or viral infection diseases.

The present invention provides a use of a cocrystal comprising camostat or a pharmaceutically acceptable salt thereof, and niclosamide for preparing a formulation for the prevention or treatment of cancers, inflammatory diseases or viral infection diseases.

The present invention provides a cocrystal comprising camostat or a pharmaceutically acceptable salt thereof, niclosamide, and a co-former; a pharmaceutical composition including the same and a preparation method therefor.

The present invention provides a method for the prevention or treatment of cancers, inflammatory diseases or viral infection diseases, including administering a cocrystal comprising camostat or a pharmaceutically acceptable salt thereof, niclosamide, and a co-former to a subject.

The present invention provides a use of a cocrystal comprising camostat or a pharmaceutically acceptable salt thereof, niclosamide, and a co-former for the prevention or treatment of cancers, inflammatory diseases or viral infection diseases.

The present invention provides a use of a cocrystal comprising camostat or a pharmaceutically acceptable salt thereof, niclosamide, and a co-former for preparing a formulation for the prevention or treatment of cancers, inflammatory diseases or viral infection diseases.

Technical Solution

The present inventors tried to maximize the efficacy while simultaneously applying niclosamide which mainly acts inside a cell, and camostat which inhibits the endocytosis of virus from the outside of the cell.

As a result, the present inventors have prepared a cocrystal comprising camostat or a pharmaceutically acceptable salt thereof, and niclosamide; or a cocrystal comprising camostat or a pharmaceutically acceptable salt thereof, niclosamide and a co-former to prepare a cocrystal with improved solubility and permeability of individual drugs and confirmed excellent efficacy thereof and then completed the present invention.

Hereinafter, the present invention will be described in detail. Meanwhile, each description and embodiment disclosed in the present invention may also be applied to each of other descriptions and embodiments. That is, all combinations of the various components disclosed in the present invention belong to the scope of the present invention. In addition, the specific description described below may not limit the scope of the present invention.

Unless otherwise contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Cocrystal

The present invention provides a cocrystal comprising camostat or a pharmaceutically acceptable salt thereof, and niclosamide. The cocrystal is a fusion crystal including camostat or a pharmaceutically acceptable salt thereof and niclosamide, and may refer to a cocrystal consisting of camostat or a pharmaceutically acceptable salt thereof and niclosamide.

The cocrystal including the camostat or the pharmaceutically acceptable salt thereof and the niclosamide has improved solubility, bioavailability, and biomembrane permeability to be usefully used for cancers, inflammatory diseases, and viral infection diseases. In addition, the cocrystal is a material with significantly increased solubility and bioavailability compared to a conventional single material of niclosamide or camostat, and may have improved solubility and biomembrane permeability to be effectively used for the prevention and/or treatment of cancers, inflammatory bowel diseases or viral infectious diseases such as coronavirus. In addition, the cocrystal is economical because the cocrystal is easy to store due to its excellent stability and may be easily mass-produced due to easy manufacturing.

In one example of the present invention, the cocrystal including the camostat or the pharmaceutically acceptable salt thereof and the niclosamide may exhibit a differential scanning calorimetry (DSC) endothermic peak at 144.38±3° C. when a heating rate is 10° C./min.

The cocrystal may have a powder X-ray diffraction (XRD) pattern including diffraction peaks represented at diffraction angle 2θ (±0.2°) values of 5.37715°, 15.1122°, 18.2258°, 18.7579°, 20.3344°, 25.596° and 26.069°.

In addition, the cocrystal may have a powder X-ray diffraction (XRD) pattern further including diffraction peaks represented at diffraction angle 2θ (±0.2°) values of at least one or more of 10.6979°, 13.1612°, 17.7134°, 26.4434° and 27.882°.

In one example of the present invention, the cocrystal including the camostat or the pharmaceutically acceptable salt thereof and the niclosamide may exhibit a differential scanning calorimetry (DSC) endothermic peak at 126.35±3° C. when a heating rate is 10° C./min.

The cocrystal may have a powder X-ray diffraction (XRD) pattern including diffraction peaks represented at diffraction angle 2θ (±0.2°) values of 6.55954°, 10.7176°, 18.147°, 19.5855°, 21.3591° and 26.8178°.

In addition, the cocrystal may have a powder X-ray diffraction (XRD) pattern further including diffraction peaks represented at diffraction angle 2θ (±0.2°) values of at least one or more of 13.8509°, 15.2501°, 16.6296°, 20.9059°, 22.3642°, 24.3151°, 24.8866° and 27.7637°.

In one example of the present invention, the cocrystal including the camostat or the pharmaceutically acceptable salt thereof and the niclosamide may exhibit a differential scanning calorimetry (DSC) endothermic peak at 182.74±3° C. when a heating rate is 10° C./min.

The cocrystal may have a powder X-ray diffraction (XRD) pattern including diffraction peaks represented at diffraction angle 2θ (±0.20) values of 11.3876°, 16.0975°, 16.6493°, 18.679°, 23.0539°, 23.9013°, 24.43330 and 29.7344°.

In addition, the cocrystal may have a powder X-ray diffraction (XRD) pattern further including diffraction peaks represented at diffraction angle 2θ (±0.20) values of at least one or more of 7.82075°, 18.679°, 19.0929°, 22.6992°, 25.4975°, 26.9755° and 30.365°.

In one example of the present invention, the cocrystal including the camostat or the pharmaceutically acceptable salt thereof and the niclosamide may exhibit a differential scanning calorimetry (DSC) endothermic peak at 151.69±3° C. when a heating rate is 10° C./min.

The cocrystal may have a powder X-ray diffraction (XRD) pattern including diffraction peaks represented at diffraction angle 2θ (±0.20) values of 6.81572°, 7.46604°, 9.87023°, 12.3532°, 13.24° and 18.6396°.

In addition, the cocrystal may have a powder X-ray diffraction (XRD) pattern further including diffraction peaks represented at diffraction angle 2θ (±0.20) values of at least one or more of 12.8262°, 22.6795°, 23.259°, 24.7881°, 25.6946° and 27.5667°.

Further, the present invention provides a cocrystal comprising camostat or a pharmaceutically acceptable salt thereof, niclosamide, and a co-former. The cocrystal is a fusion crystal including camostat or a pharmaceutically acceptable salt thereof, niclosamide, and a co-former, and may refer to a cocrystal consisting of camostat or a pharmaceutically acceptable salt thereof, niclosamide, and a co-former.

The cocrystal comprising the camostat or the pharmaceutically acceptable salt thereof, the niclosamide, and the co-former has improved solubility, bioavailability, and biomembrane permeability to be usefully used for cancers, inflammatory diseases, and viral infection diseases. In addition, the cocrystal is a material with significantly increased solubility and bioavailability compared to a conventional single material of niclosamide or camostat, and may have improved solubility and permeability to be effectively used for the prevention and/or treatment of cancers, inflammatory bowel diseases or viral infectious diseases such as coronavirus. In addition, the cocrystal is economical because the cocrystal is easy to store due to its excellent stability and may be easily mass-produced due to easy manufacturing.

In one example of the present invention, the cocrystal including the camostat or the pharmaceutically acceptable salt thereof, the niclosamide, and the co-former may exhibit a differential scanning calorimetry (DSC) endothermic peak at 126.03° C. when a heating rate is 10° C./min.

The cocrystal may have a powder X-ray diffraction (XRD) pattern including diffraction peaks represented at diffraction angle 2θ (±0.20) values of 7.0522°, 7.6239°, 9.06226°, 12.4912°, 18.009° and 21.9897°.

In addition, the cocrystal may have a powder X-ray diffraction (XRD) pattern further including diffraction peaks represented at diffraction angle 2θ (±0.2°) values of at least one or more of 24.2166° and 27.1134°.

The cocrystal of the present invention has a molar ratio between the camostat or the pharmaceutically acceptable salt thereof and the niclosamide of about 1:4 to 4:1, more specifically about 1:1.

When the cocrystal of the present invention includes the co-former, the cocrystal may include the co-former of about 1 to 6 moles, more specifically about 5 moles with respect to 1 mole of the camostat or the pharmaceutically acceptable salt thereof or the niclosamide.

The co-former is not particularly limited as long as the co-former is pharmaceutically acceptable, and may be at least one selected from meglumine, histidine, arginine, nicotinamide, benzoate, formic acid, sorbic acid, citric acid, malic acid, caffeine, theophylline, urea, and the like. In one example of the present invention, the co-former may be meglumine, nicotinamide, caffeine, arginine or citric acid.

In the present invention, the "cocrystal" means a form in which two or more different molecules form a crystal structure at a constant stoichiometric ratio in one crystal lattice, and the intermolecular binding form in the cocrystal is distinguished from a salt and a mixture.

In the present invention, the cocrystal, which may be interpreted as referring to the "cocrystal of the present invention", "the cocrystal of the present disclosure" or the cocrystal of the present disclosure, may refer to both the cocrystal including the camostat or the pharmaceutically acceptable salt thereof and the niclosamide; and the cocrystal including the camostat or the pharmaceutically acceptable salt thereof, the niclosamide and the co-former.

In the present invention, the "pharmaceutically acceptable salt" is not particularly limited as long as the pharmaceutically acceptable salt is salts prepared by conventional methods known to those skilled in the art. For example, the pharmaceutically acceptable salt of the camostat may be a sulfonic acid salt prepared with at least one acid selected from methanesulfonic acid, ethanesulfonic acid, benzenesulfonic acid, p-toluenesulfonic acid, naphthalenesulfonic acid, etc. In one example of the present invention, the pharmaceutically acceptable salt may be a methanesulfonic acid salt, that is, a mesylate salt. In one example of the present invention, the pharmaceutically acceptable salt of the camostat in the cocrystal may be camostat mesylate.

In the present invention, the "co-former" is a pharmacologically inactive molecule that alters the crystal form of a solid drug through the formation of a co-crystal, a clathrate or other crystalline solid forms, and may refer to an inactive molecule among molecules constituting a crystal of the cocrystal.

The cocrystal of the present invention may have a structure in which one molecule of niclosamide is bound to one molecule of camostat or a pharmaceutically acceptable salt of the camostat. In addition, the cocrystal may have a structure in a structure in which one molecule of niclosamide is bound to one molecule of camostat or a pharmaceutically acceptable salt of the camostat and one molecule or more of co-formers. In addition, cocrystals having various binding ratios may be included.

Preparation Method for Cocrystal

The present invention provides a preparation method for a cocrystal comprising camostat or a pharmaceutically acceptable salt thereof, and niclosamide. The preparation method includes mixing, fusing, and cocrystallizing camostat or a pharmaceutically acceptable salt thereof, and niclosamide.

In one example of the present invention, the cocrystallizing may include mixing the camostat or the pharmaceutically acceptable salt thereof, and the niclosamide, with a solvent. Specifically, the cocrystallizing may include preparing a mixed solution by mixing the camostat or the pharmaceutically acceptable salt thereof, the niclosamide with the solvent; and obtaining a cocrystal from the mixed solution. For example, the camostat or the pharmaceutically acceptable salt thereof, the niclosamide may be crystallized in the mixed solution to obtain a cocrystal, and the cocrystal synthesized in the mixed solution may be isolated in a dry powder form.

The solvent may be at least one selected from water, straight-chain or branched-chain alcohol having 1 to 5 carbon atoms, acetone, acetonitrile, dimethylsulfoxide (DMSO), dimethylformamide (DMF), dimethylacetamide (DMA), ethyl acetate, toluene, hexane, tetrahydrofuran, and the like. Examples of the alcohol may be one or more selected from methanol, ethanol, 2-propanol, n-propanol, and the like, but are not limited thereto.

In one example of the present invention, the camostat or the pharmaceutically acceptable salt thereof and the niclosamide may be mixed and fused in a molar ratio of about 1:4 to 4:1, more specifically about 1:1, and in addition, may be mixed and fused in various ratios.

The obtaining of the cocrystal by removing the solvent may include removing the solvent from the mixed solution through filtration and then drying the mixed solution under a reduced pressure condition. Through the drying process, a solid cocrystal powder may finally be obtained.

In one example of the present invention, camostat mesylate may be used as a salt of camostat.

The present invention provides a preparation method for a cocrystal comprising camostat or a pharmaceutically acceptable salt thereof, niclosamide, and a co-former. The preparation method includes mixing, fusing, and cocrystallizing camostat or a pharmaceutically acceptable salt thereof, niclosamide and a co-former.

In one example of the present invention, the cocrystallizing may include mixing the camostat or the pharmaceutically acceptable salt thereof, the niclosamide, and the co-former with a solvent. Specifically, the cocrystallizing may include preparing a mixed solution by mixing the camostat or the pharmaceutically acceptable salt thereof, the niclosamide, and the co-former with the solvent; and obtaining a cocrystal from the mixed solution. For example, the camostat or the pharmaceutically acceptable salt thereof, the niclosamide, and the co-former may be crystallized in the mixed solution to obtain a cocrystal, and the cocrystal synthesized in the mixed solution may be isolated in a dry powder form.

In one example of the present invention, the camostat or the pharmaceutically acceptable salt thereof and the niclosamide may be mixed and fused in a molar ratio of about 1:4 to 4:1, more specifically about 1:1, and in addition, may be mixed and fused in various ratios.

In addition, the co-former may be included in an amount of about 1 to 6 moles, more specifically about 5 moles with respect to 1 mole of the camostat or the pharmaceutically acceptable salt thereof or the niclosamide.

Specifically, the molar ratio of the camostat or the pharmaceutically acceptable salt thereof, the niclosamide, and the co-former may be 1:1:1 to 1:1:6.

The contents of the solvent and the obtaining of the cocrystal by removing the solvent in the preparation method for the cocrystal comprising the camostat or the pharmaceutically acceptable salt thereof, the niclosamide, and the co-former may be applied in the same manner as matters mentioned in the preparation method for the cocrystal comprising the camostat or the pharmaceutically acceptable salt thereof, and the niclosamide.

In addition to the preparation method, the cocrystal of the present invention may be prepared in various combinations according to a drug composition ratio, a type of alkalizing agent, type and ratio of solvent, etc. The cocrystal of the present invention may be a crystal in which camostat or a pharmaceutically acceptable salt thereof and niclosamide all are present in one crystal lattice, and may be a crystal in which camostat or a pharmaceutically acceptable salt thereof, niclosamide, and a co-former all are present in one crystal lattice.

The cocrystal of the present invention, the preparation method therefor, etc. are as follows:

1. A cocrystal comprising camostat or a pharmaceutically acceptable salt thereof, and niclosamide.

2. The cocrystal of item 1, wherein the cocrystal consists of camostat or a pharmaceutically acceptable salt thereof, and niclosamide.

3. The cocrystal of items 1 and 2, wherein a molar ratio of the camostat or the pharmaceutically acceptable salt thereof and the niclosamide is 1:4 to 4:1.

4. The cocrystal of items 1 and 2, wherein the molar ratio of the camostat or the pharmaceutically acceptable salt thereof and the niclosamide is 1:1.

5. The cocrystal of items 1 to 4, wherein a powder X-ray diffraction (XRD) pattern includes diffraction peaks represented at diffraction angle 2θ (±0.20) values of 5.37715°, 15.1122°, 18.2258°, 18.7579°, 20.3344°, 25.596° and 26.069°.

6. The cocrystal of items 1 to 4, wherein when the heating rate is 10° C./min, a differential scanning calorimetry (DSC) endothermic peak is shown at 144.38±3° C.

7. The cocrystal of items 1 to 4, wherein the powder X-ray diffraction (XRD) pattern includes diffraction peaks represented at diffraction angle 2θ (±0.2°) values of 6.55954°, 10.7176°, 18.147°, 19.5855°, 21.3591°, and 26.8178°.

8. The cocrystal of items 1 to 4, wherein when the heating rate is 10° C./min, a differential scanning calorimetry (DSC) endothermic peak is shown at 126.35±3° C.

9. The cocrystal of items 1 to 4, wherein the powder X-ray diffraction (XRD) pattern includes diffraction peaks represented at diffraction angle 2θ (±0.20) values of 11.3876°, 16.0975°, 16.6493°, 18.679°, 23.0539°, 23.9013°, 24.4333°, and 29.7344°.

10. The cocrystal of items 1 to 4, wherein when the heating rate is 10° C./min, a differential scanning calorimetry (DSC) endothermic peak is shown at 182.74±3° C.

11. The cocrystal of items 1 to 4, wherein the powder X-ray diffraction (XRD) pattern includes diffraction peaks represented at diffraction angle 2θ (±0.2°) values of 6.81572°, 7.46604°, 9.87023°, 12.3532°, 13.24°, and 18.6396°.

12. The cocrystal of items 1 to 4, wherein when the heating rate is 10° C./min, a differential scanning calorimetry (DSC) endothermic peak is shown at 151.69±3° C.

13. A cocrystal comprising camostat or a pharmaceutically acceptable salt thereof, niclosamide, and a co-former.

14. The cocrystal of item 13, wherein the cocrystal consists of camostat or a pharmaceutically acceptable salt thereof, niclosamide, and a co-former.

15. The cocrystal of items 13 and 14, wherein a molar ratio of the camostat or the pharmaceutically acceptable salt thereof, the niclosamide, and the co-former is 1:1:1 to 1:1:6.

16. The cocrystal of items 13 and 14, wherein the co-former is at least one selected from meglumine, histidine, arginine, nicotinamide, benzoate, formic acid, sorbic acid, citric acid, malic acid, caffeine, theophylline and urea.

17. The cocrystal of items 13 and 14, wherein a powder X-ray diffraction (XRD) pattern includes diffraction peaks represented at diffraction angle 2θ (±0.2°) values of 7.0522°, 7.6239°, 9.06226°, 12.4912°, 18.009°, and 21.9897°. 18. The cocrystal of items 13 to 16, wherein when the heating rate is 10° C./min, a differential scanning calorimetry (DSC) endothermic peak is shown at 126.03° C.

19. A preparation method for the cocrystal according to any one of items 1 to 12, including mixing and cocrystallizing camostat or a pharmaceutically acceptable salt thereof, and niclosamide.

20. The preparation method for the cocrystal according to any one of items 1 to 12 of item 19, wherein the cocrystallizing includes mixing the camostat or the pharmaceutically acceptable salt thereof, and the niclosamide with a solvent, in which the solvent is at least one selected from water, straight-chain or branched-chain alcohol having 1 to 5 carbon atoms, acetone, acetonitrile, dimethylsulfoxide (DMSO), dimethylformamide (DMF), dimethylacetamide (DMA), ethyl acetate, toluene, hexane, and tetrahydrofuran.

21. The preparation method for the cocrystal according to any one of items 1 to 12 of items 19 and 2°, wherein in the cocrystallizing, the camostat or the pharmaceutically acceptable salt thereof, and the niclosamide are fused at a molar ratio of 1:4 to 4:1.

22. The preparation method for the cocrystal according to any one of items 1 to 12 of items 19 and 2°, wherein in the cocrystallizing, the camostat or the pharmaceutically acceptable salt thereof, and the niclosamide are fused at a molar ratio of 1:1.

23. A preparation method for the cocrystal according to any one of items 13 to 18, including fusing and cocrystallizing camostat or a pharmaceutically acceptable salt thereof, niclosamide, and a co-former.

24. A pharmaceutical composition for the prevention or treatment of cancers, inflammatory diseases or viral infection diseases, including the cocrystal according to any one of items 1 to 18 as an active ingredient.

25. The pharmaceutical composition of item 24, wherein the cancer is at least one selected from pancreatic cancer, breast cancer, liver cancer and lung cancer.

26. The pharmaceutical composition of item 24, wherein the viral infection disease is at least one selected from coronavirus infectious disease, SARS virus infection, influenza virus infection and murder mite-borne infection.

27. The pharmaceutical composition of item 24, wherein the inflammatory disease is at least one selected from allergy, dermatitis, atopy, conjunctivitis, periodontitis, rhinitis, otitis media, sore throat, tonsillitis, pneumonia, gastric ulcer, gastritis, Crohn's disease, colitis, ankylosing spondylitis, fibromyalgia, psoriatic arthritis, osteoarthritis, tendonitis, tenosynovitis, peritendinitis, myositis, hepatitis, cystitis, nephritis, Sjogren's syndrome, multiple sclerosis, acute inflammatory disease, and chronic inflammatory disease.

28. A method for the prevention or treatment of cancers, inflammatory diseases or viral infection diseases, including administering the cocrystal according to any one of items 1 to 18 to a subject.

29. A use of the cocrystal according to any one of items 1 to 18 for the prevention or treatment of cancers, inflammatory diseases or viral infection diseases.

30. A use of the cocrystal according to any one of items 1 or 18 for preparation of a formulation for the prevention or treatment of cancers, inflammatory diseases or viral infection diseases.

Pharmaceutical Composition, Treatment Method Using the Same and Use Thereof

The present invention provides a pharmaceutical composition including a cocrystal comprising camostat or a pharmaceutically acceptable salt thereof, and niclosamide as an active ingredient.

The present invention provides a pharmaceutical composition for the prevention or treatment of cancers, inflammatory diseases or viral infection diseases, including a cocrystal comprising camostat or a pharmaceutically acceptable salt thereof, and niclosamide as an active ingredient.

The present invention provides a pharmaceutical composition including a cocrystal comprising camostat or a pharmaceutically acceptable salt thereof, niclosamide, and a co-former as an active ingredient.

The present invention provides a pharmaceutical composition for the prevention or treatment of cancers, inflammatory diseases or viral infection diseases, including a cocrystal comprising camostat or a pharmaceutically acceptable salt thereof, niclosamide, and a co-former as an active ingredient.

The pharmaceutical composition including the cocrystal of the present invention as the active ingredient may be usefully used for preventing or treating cancers, inflammatory diseases, and viral infection diseases.

The pharmaceutical composition including the cocrystal of the present invention as the active ingredient may be formulated into tablets, powders, and fine granules, granules, capsules, pills, liquids, injections, suppositories, ointments and patches, etc. using carriers, excipients, and other additives for commonly used pharmaceutically acceptable agents, and administered orally or parenterally.

The pharmaceutically acceptable carrier may be specifically, at least one selected from lactose, dextrose, sucrose, sorbitol, mannitol, sugar, fructose, pre-gelatinized starch, starch, gum acacia, calcium phosphate, carrageenic acid, sodium carboxymethylcellulose, calcium carboxymethylcellulose, alginate, gelatin, calcium silicate, light anhydrous silicic acid or derivatives thereof, silicon dioxide, polyacrylate or copolymers thereof, microcrystalline cellulose, polyvinylpyrrolidine, cellulose, water, syrup, methyl cellulose, methyl hydroxybenzoate, propyl hydroxybenzoate, talc, magnesium stearate, minerals and oils, but is not limited thereto. The agent may be prepared by conventional methods used for formulation in the art, and may be formulated into various agents according to each disease or component.

Liquid compositions for oral administration may include pharmaceutically acceptable emulsions, solutions, suspensions, syrups, elixirs, etc., and generally used inert diluents, such as purified water, dimethyl sulfoxide (DMSO), polysorbate 20, polysorbate 80 or ethyl alcohol. The pharmaceutical composition may contain adjuvants such as solubilizers, solubilizing aids, wetting agents, and suspending agents, sweeteners, flavors, aromatics, or preservatives, in addition to the inert diluents.

Injections for parenteral administration may include sterile aqueous or non-aqueous solutions, suspensions, emulsions, or the like. Examples of diluents for aqueous solutions and suspensions may include distilled water for injections, physiological saline, and the like. The diluents for non-aqueous solutions and suspensions include, for example, glycols such as propylene glycol and polyethylene glycol; vegetable oils such as olive oil, and corn oil; alcohols such as ethyl alcohol; lipophilic surfactants such as SPAN 80; and hydrophilic surfactants such as polysorbate 80.

The pharmaceutical composition of the present invention may include additives such as isotonic agents, preservatives, wetting agents, emulsifiers, dispersants, stabilizers, solubilizers, or solubilizing aids. These additives may be sterilized by filtration through a bacteria-retaining filter for sterilizing, by combination of bactericides or by ultraviolet irradiation. In addition, in the present invention, a sterile solid composition may be prepared and dissolved in a sterile solvent for injection before use and then used.

A dosage (therapeutically effective amount) of the cocrystal according to the present invention to the subject may be appropriately determined in consideration of the indication, severity of disease, body weight, age, sex, etc., and the dosage and usage may appropriately vary depending on various conditions.

The pharmaceutically effective amount and the effective dosage of the pharmaceutical composition of the present invention may vary depending on a formulation method, an administration method, an administration time and/or a route of administration of the pharmaceutical composition, etc. In addition, the dosage may vary depending on various factors including the type and degree of a response to be achieved by administration of the pharmaceutical composition, the type, age, weight, and general health condition, symptoms or severity of a disease, sex, diet, and excretion of a subject to be administered, drugs used simultaneously or separately for the corresponding subject, other composition ingredients, and the like, and similar factors well-known in the field of medicine. Those skilled in the art may easily determine and prescribe an effective dosage for a desired treatment.

The present invention provides a method for the prevention or treatment of cancers, inflammatory diseases or viral infection diseases, including administering a cocrystal comprising camostat or a pharmaceutically acceptable salt thereof, and niclosamide; or a pharmaceutical composition including the cocrystal to a subject.

The present invention provides a method for the prevention or treatment of cancers, inflammatory diseases or viral infection diseases, including administering a cocrystal comprising camostat or a pharmaceutically acceptable salt thereof, niclosamide, and a co-former; or a pharmaceutical composition including the cocrystal to a subject.

The method for the prevention or treatment of cancers, inflammatory diseases or viral infection diseases of the present invention may be administering the cocrystal of the present invention in a therapeutically effective amount.

The cocrystal of the present invention may be usefully used for the prevention or treatment of cancers, inflammatory diseases or viral infection diseases.

The cocrystal of the present invention may be administered to a subject suffering from cancers, inflammatory diseases or viral infection diseases.

The "administration" means introducing a desired substance into the subject in an appropriate manner.

In the present invention, the "subject" means all animals such as rats, mice, livestock, etc., including humans, and may specifically be mammals including humans, but is not limited thereto.

In the present invention, the "prevention" refers to all actions that suppress or delay the onset of diseases by administration of the cocrystal of the present invention.

In the present invention, the "treatment" refers to all actions that improve or beneficially change the symptoms of a subject suspected of or suffering from diseases by the administration of the cocrystal of the present invention.

As used herein, the "pharmaceutically effective dose" refers to an amount enough to treat diseases at a reasonable benefit/risk ratio applicable to medical treatment and enough to not cause side effects. An effective dose level may be determined according to a gender, an age, a body weight, and a health condition of a patient, a disease type, severity, drug activity, sensitivity to drug, an administration method, an administration time, an administration route and excretion rate, a treatment period, factors including drugs used in combination or concurrently, and other factors well-known in medical fields by those skilled in the art. However, for the purpose of the present invention, preferably, the specific therapeutically effective dose for a specific patient may vary depending on various factors well known in the medical field, including the kind and degree of the response to be achieved, specific compositions according to whether other agents are used in some cases, the age, body weight, general health conditions, gender, and diet of a patient, an administration time, an administration route, the secretion rate of the composition, a duration of treatment, other drugs used in combination or simultaneously with a specific composition, and similar factors well known in the medical field.

In the present invention, the "cancer" may be at least one selected from lung cancer, pancreatic cancer, gastric cancer, myelodysplastic syndrome, leukemia including acute lymphocytic leukemia (ALL) and acute myeloid leukemia (AML), adrenal cancer, anal cancer, basosquamous cell skin cancer, cholangiocarcinoma, bladder cancer, bone cancer, cerebrospinal tumor, brain cancer, breast cancer, cervical cancer, chronic lymphocytic leukemia (CLL), chronic myelogenous leukemia (CML), chronic myelomonocytic leukemia (CMML), colorectal cancer, endometrial cancer, esophageal cancer, Ewing family tumor, eye cancer, gallbladder cancer, gastrointestinal carcinoid tumor, gastrointestinal stromal tumor (GIST), gestational choriocarcinoma, glioma, Hodgkin's lymphoma, Kaposi's sarcoma, kidney cancer, hypopharyngeal cancer, liver cancer, lung carcinoid, lymphomas including cutaneous T-cell lymphoma, malignant mesothelioma, melanoma skin cancer, Merkel cell skin cancer, multiple myeloma, nasal and paranasal cancer, nasopharyngeal cancer, neuroblastoma, non-Hodgkin's lymphoma, non-small cell lung cancer, oral and oropharyngeal cancer, osteosarcoma, ovarian cancer, penile cancer, pituitary tumor, prostate cancer, retinoblastoma, rhabdomyosarcoma, salivary gland cancer, skin cancer, small cell lung cancer, small bowel cancer, soft tissue sarcoma, testicular cancer, thymus cancer, thyroid cancer including undifferentiated thyroid cancer, uterine sarcoma, vaginal cancer, vulvar cancer, Waldenstroms macroglobulinemia, Wilms tumor, and the like.

In the present invention, the "inflammatory disease" may be at least one selected from allergy, dermatitis, atopy, conjunctivitis, periodontitis, rhinitis, otitis media, sore throat, tonsillitis, pneumonia, gastric ulcer, gastritis, Crohn's disease, colitis, ankylosing spondylitis, fibromyalgia, psoriatic arthritis, osteoarthritis, tendonitis, tenosynovitis, peritendinitis, myositis, hepatitis, cystitis, nephritis, Sjogren's syndrome, multiple sclerosis, acute inflammatory disease, chronic inflammatory disease, and the like.

In the present invention, the "viral infection disease" may be at least one selected from a coronavirus infection disease caused by coronavirus infection, an influenza virus infection (flu) caused by influenza virus infection, a SARS virus infection caused by SARS virus infection, a murder mite-borne infection caused by murder mite infection, and the like.

The coronavirus may be at least one selected from Alphacoronavirus, Betacoronavirus, Gammacoronavirus, Deltacoronavirus, and variable coronavirus.

The coronavirus infection disease may be severe acute respiratory syndrome (SARS), specifically, may be a disease caused by severe acute respiratory syndrome coronavirus 2 (SARS-CoV-2), and more specifically, coronavirus infectious disease-19. It was confirmed that the cocrystal of the present invention has excellent antiviral activity against SARS-CoV-2. That is, the cocrystal of the present invention may inhibit the cell invasion of SARS-CoV-2. The cocrystal of the present invention may prevent or treat COVID-19 as a disease caused by SARS-CoV-2.

Symptoms of the SARS-CoV-2 infectious disease may include fever, malaise, cough, shortness of breath, phlegm, sore throat, headache, hemoptysis, nausea, gastrointestinal symptoms, kidney disease, respiratory disease, diarrhea, and the like.

The present invention provides a use of a cocrystal comprising camostat or a pharmaceutically acceptable salt thereof, and niclosamide for the prevention or treatment of cancers, inflammatory diseases or viral infection diseases.

The present invention provides a use of a cocrystal comprising camostat or a pharmaceutically acceptable salt thereof, niclosamide, and a co-former for the prevention or treatment of cancers, inflammatory diseases or viral infection diseases.

The present invention provides a use of a cocrystal comprising camostat or a pharmaceutically acceptable salt thereof, and niclosamide for preparing a formulation for the prevention or treatment of cancers, inflammatory diseases or viral infection diseases.

The present invention provides a use of a cocrystal comprising camostat or a pharmaceutically acceptable salt thereof, niclosamide, and a co-former for preparing a formulation for the prevention or treatment of cancers, inflammatory diseases or viral infection diseases.

Matters mentioned in respective items of the present invention, that is, the cocrystal, the preparation method, the pharmaceutical composition, the treatment method, and the use, are applied in the same manner unless contradictory to each other.

Advantageous Effects

According to the present invention, the cocrystal has improved solubility, bioavailability and biomembrane permeability and thus may be usefully used for cancers, inflammatory diseases and viral infection diseases.

According to the present invention, the cocrystal is a material with significantly increased solubility and bioavailability compared to a conventional single material of niclosamide or camostat, and has improved solubility and biomembrane permeability and thus can be effectively used for the prevention and/or treatment of cancers, inflammatory diseases or viral infection diseases such as coronavirus.

According to the present invention, the cocrystal is economical because the cocrystal is easy to store due to its excellent stability and can be easily mass-produced due to easy manufacturing.

MODES OF THE INVENTION

Hereinafter, the best mode for implementing the present invention will be described in detail.

The present inventors of the present invention have developed a cocrystal comprising camostat or a pharmaceutically acceptable salt thereof, and niclosamide; and a cocrystal comprising camostat or a pharmaceutically acceptable salt thereof, niclosamide and a co-former, and analyzed the prepared cocrystals by the following various experimental methods to confirm the formation of cocrystals.

In the cocrystals of the present invention, as described above, a single cocrystal having a constant quality was obtained with good reproducibility. In addition, the cocrystals of the present invention may be stably supplied as crystals of raw medicines (pharmaceutical raw materials) used in the manufacture of medicine and has excellent storage stability. A difference in crystal type between a simple mixture and the cocrystal may be clear from the results of differential scanning calorimetry (DSC) analysis and powder X-ray diffraction (PXRD) analysis.

Figure 1:
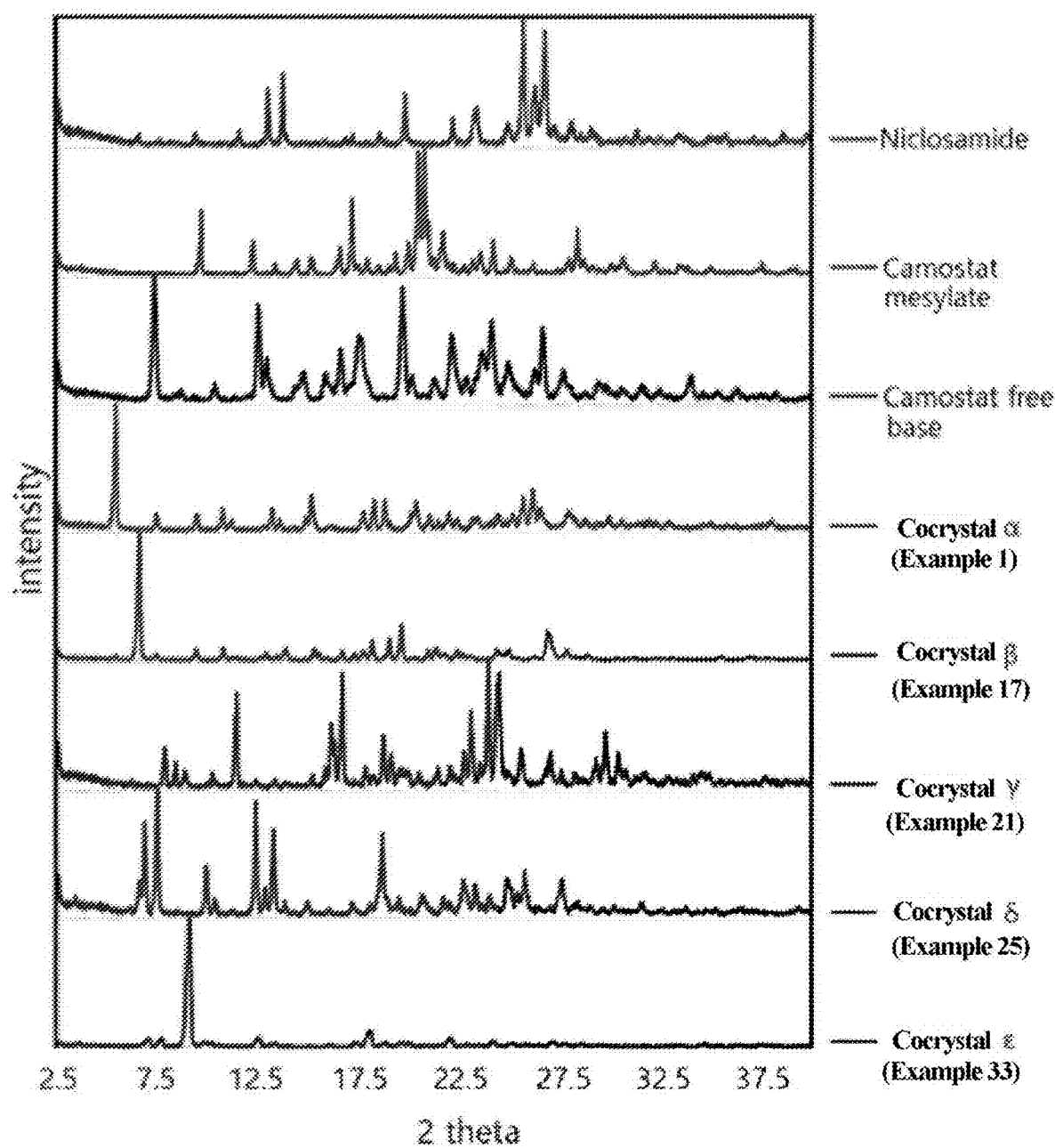
FIG. 1 is a powder X-ray diffraction (PXRD) result of niclosamide, camostat mesylate, camostat, and cocrystals α, β, γ, δ, and ε of the present invention.

Niclosamide and camostat mesylate salts are specified by PXRD diffraction angles, relative intensities and DSC endothermic peaks listed in Tables 8 and 10 and FIG. 1. As the cocrystal of the present invention, a cocrystal α, a cocrystal β, a cocrystal γ, a cocrystal δ, and a cocrystal ε are specified by PXRD diffraction angles, relative intensities and DSC endothermic peaks listed in Tables 9 and 10 and FIG. 1.

In XRD diffraction, due to the nature of the data, the crystal lattice spacing or overall pattern is important in determining the identity of crystals, and the heat flow measurement results should not be interpreted too strictly because the results may change somewhat depending on a direction of crystal growth, a particle size, and measurement conditions.

The preparation method for the cocrystal according to the present invention includes mixing and cocrystallizing the camostat or the pharmaceutically acceptable salt thereof, and the niclosamide, and at this time, the cocrystallizing may be performed by various methods known as the preparation method for the cocrystal.

For example, the cocrystals α, β, γ, δ, and ε according to the present invention may be each independently prepared by crystallizing methods such as a liquid-assisted grinding method, a slurry method, and a solvent cooling method.

In the case of using the liquid-assisted grinding method, camostat or a pharmaceutically acceptable salt thereof and an alkalizing agent were ground and reacted with a solvent such as a small amount of distilled water using an instrument such as a pestle and a bowl and then continuously ground by adding a small amount of distilled water, an organic solvent such as acetone, acetonitrile, tetrahydrofuran or alcohols, and niclosamide to prepare the cocrystal according to the present invention.

In the case of using the slurry method, camostat or a pharmaceutically acceptable salt thereof and the alkalizing agent were added with distilled water, alcohol organic solvents such as acetone, acetonitrile, tetrahydrofuran or methanol, ethanol, and isopropyl alcohol, and niclosamide to make a supersaturated solution and then continuously stirred to prepare the cocrystal according to the present invention. In addition, the dry cocrystal was added in a specific organic solvent to make a slurry to prepare a cocrystal having a different crystal type.

In the case of using the solvent cooling method, camostat or a pharmaceutically acceptable salt thereof and the alkalizing agent were stirred and reacted in a first solvent such as distilled water and then added with a niclosamide solution heated and completely dissolved in a second solvent such as acetone or alcohols, and the mixture was stirred while cooling the solvent to synthesize the cocrystal according to the present invention. A volume ratio of the first solvent and the second solvent may be about 10:1 to 1:10. For example, the volume ratio of the first solvent and the second solvent may be about 4:1 to 5:1.

In an anti-solvent method, camostat mesylate and an alkalizing agent were stirred and reacted in a first solvent such as distilled water, and then filtered and dried to obtain dry powered camostat, and the dry camostat was mixed and stirred with a niclosamide solution heated and completely dissolved in a second solvent such as acetone or alcohols. In addition, the mixture was added with distilled water as an anti-solvent to prepare the cocrystal according to the present invention.

The alkalizing agent used in the liquid-assisted grinding method, the slurry method, the solvent cooling method or the anti-solvent method may be at least one selected from basic materials such as sodium bicarbonate ($NaHCO_3$), sodium carbonate ($Na_2CO_3$), sodium hydroxide (NaOH), potassium hydroxide (KOH), calcium hydroxide ($Ca(OH)_2$) and magnesium hydroxide ($Mg(OH)_2$), but is not limited thereto.

Hereinafter, the present invention will be specifically described by Examples. That is, the cocrystal including the camostat or the pharmaceutically acceptable salt thereof and the niclosamide of the present invention may be prepared through methods to be described below, but any examples provided herein, or use of exemplary language, are intended merely to better illustrate the present invention and do not limit the scope of the present invention to be claimed.

completely dissolved while stirring at 100 rpm. The camostat mesylate solution and the niclosamide solution were filtered using a 0.45 μm filter to remove possible foreign substances. The filtered camostat mesylate solution was added and mixed with a sodium bicarbonate solution, and stirred at 100 rpm for 30 minutes. When the mixed solution became sufficiently opaque, the filtered niclosamide solution was added and stirred at 200 rpm for 3 hours. Thereafter, the reactant was filtered using a vacuum pump and a paper filter to remove the solvent, and then dried at 30° C. for one day using a vacuum dryer to obtain a cocrystal α in the form of dry powder.

Examples 2 to 8

Cocrystals α of Examples 2 to 8 were prepared using substantially the same method as the preparation method of Example 1, but using components and contents shown in Table 1 below.

TABLE 1

| Classification | Niclosamide | Camostat mesylate | Alkalizing agent | First solvent | Second solvent |
| --- | --- | --- | --- | --- | --- |
| Example 1 | 32.71 g | 49.45 g | $NaHCO_3$ 8.4 g | Distilled water 2.6 kg | Anhydrous ethanol 2.0 kg |
| Example 2 | 32.71 g | 49.45 g | NaOH 3.9 g | Distilled water 2.6 kg | Anhydrous ethanol 2.0 kg |
| Example 3 | 32.71 g | 49.45 g | KOH 5.6 g | Distilled water 2.6 kg | Anhydrous ethanol 2.0 kg |
| Example 4 | 32.71 g | 49.45 g | $Na_2CO_3$ 10.5 g | Distilled water 2.6 kg | Anhydrous ethanol 2.0 kg |
| Example 5 | 32.71 g | 49.45 g | NaOH 3.9 g | Distilled water 2.6 kg | Acetone 2.0 kg |
| Example 6 | 32.71 g | 49.45 g | KOH 5.6 g | Distilled water 2.6 kg | Acetone 2.0 kg |
| Example 7 | 32.71 g | 49.45 g | $NaHCO_3$ 8.4 g | Distilled water 2.6 kg | Acetone 2.0 kg |
| Example 8 | 32.71 g | 49.45 g | $Na_2CO_3$ 10.5 g | Distilled water 2.6 kg | Acetone 2.0 kg |

EXAMPLES

Niclosamide from Hengcheng Pharmaceutical Co., Ltd.; Camostat mesylate from MFC Co., Ltd.; alkalizing agents such as sodium hydroxide, sodium carbonate, and sodium bicarbonate from Samchun Co., Ltd.; ethanol from Samchun Co., Ltd.; acetonitrile and acetone from Daejung Co., Ltd.; and a co-former from Merck Co., Ltd. were purchased and used in Examples.

<Examples 1 to 8> Preparation of Cocrystal α

In one Example of the present invention, a cocrystal α according to the present invention was prepared through a slurry method. The contents of niclosamide and camostat mesylate, the type and content of alkalizing agent, and the types and contents of first and second solvents were applied as shown in Table 1 below.

Example 1

49.45 g of camostat mesylate was added in 2.5 kg of 25° C. distilled water (first solvent) and completely dissolved while stirring at 100 rpm. 8.4 g of sodium bicarbonate (alkalizing agent) was added in 0.1 kg of 25° C. distilled water (first solvent) and completely dissolved while stirring at 100 rpm. In addition, 32.71 g of niclosamide was added in 2.0 kg of 30° C. anhydrous ethanol (second solvent) and <Examples 9 and 16> Preparation of Cocrystal β

In one Example of the present invention, a cocrystal β according to the present invention was prepared through a slurry method. The contents of niclosamide and camostat mesylate, the type and content of alkalizing agent, and the types and contents of first solvent, second solvent and third solvent were applied as shown in Table 2 below.

Example 9

49.45 g of camostat mesylate was added in 2.5 kg of 25° C. distilled water (first solvent) and completely dissolved while stirring at 100 rpm. 8.4 g of sodium bicarbonate (alkalizing agent) was added in 0.1 kg of 25° C. distilled water (first solvent) and completely dissolved while stirring at 100 rpm. In addition, 32.71 g of niclosamide was added in 2.0 kg of 30° C. ethanol (second solvent) and completely dissolved while stirring at 100 rpm. The camostat mesylate solution and the niclosamide solution were filtered using a 0.45 μm filter to remove possible foreign substances. The filtered camostat mesylate solution was added and mixed with a sodium bicarbonate solution, and stirred at 100 rpm for 30 minutes. When the mixed solution became sufficiently opaque, the filtered niclosamide solution was added and stirred at 100 rpm for 3 hours. Thereafter, the reactant was filtered using a vacuum pump and a paper filter to remove the solvent, and then dried at 30° C. for one day using a vacuum dryer to obtain a cocrystal raw material in the form of dry powder. The obtained cocrystal raw material was added in 1.6 kg of 25° C. anhydrous ethanol (third solvent) and stirred at 100 rpm for 3 hours. Thereafter, the reactant was filtered using a vacuum pump and a paper filter to remove the solvent, and then dried at 25° C. for one day using a vacuum dryer to obtain a cocrystal β in the form of a dry powder.

Examples 10 to 16

Cocrystals β of Examples 10 to 16 were prepared using substantially the same method as the preparation method of Example 9, but using components and contents shown in Table 2 below.

TABLE 2

| Classification | Niclosamide | Camostat mesylate | Alkalizing agent | First solvent | Second solvent | Third solvent |
| --- | --- | --- | --- | --- | --- | --- |
| Example 9 | 32.71 g | 49.45 g | $NaHCO_3$ 8.4 g | Distilled water 2.6 kg | Anhydrous ethanol 2.0 kg | Anhydrous ethanol 1.6 kg |
| Example 10 | 32.71 g | 49.45 g | NaOH 3.9 g | Distilled water 2.6 kg | Anhydrous ethanol 2.0 kg | Anhydrous ethanol 1.6 kg |
| Example 11 | 32.71 g | 49.45 g | KOH 5.6 g | Distilled water 2.6 kg | Anhydrous ethanol 2.0 kg | Anhydrous ethanol 1.6 kg |
| Example 12 | 32.71 g | 49.45 g | $Na_2CO_3$ 10.5 g | Distilled water 2.6 kg | Anhydrous ethanol 2.0 kg | Anhydrous ethanol 1.6 kg |
| Example 13 | 32.71 g | 49.45 g | NaOH 3.9 g | Distilled water 2.6 kg | Acetone 2.0 kg | Anhydrous ethanol 1.6 kg |
| Example 14 | 32.71 g | 49.45 g | KOH 5.6 g | Distilled water 2.6 kg | Acetone 2.0 kg | Anhydrous ethanol 1.6 kg |
| Example 15 | 32.71 g | 49.45 g | $Na_2CO_3$ 8.4 g | Distilled water 2.6 kg | Acetone 2.0 kg | Anhydrous ethanol 1.6 kg |
| Example 16 | 32.71 g | 49.45 g | $Na_2CO_3$ 10.5 g | Distilled water 2.6 kg | Acetone 2.0 kg | Anhydrous ethanol 1.6 kg |

<Examples 17 to 20> Preparation of Cocrystal β

In one Example of the present invention, a cocrystal Q according to the present invention was prepared through a slurry method. The contents of niclosamide and camostat mesylate, the type and content of alkalizing agent, and the types and contents of first and second solvents were applied as shown in Table 3 below.

Example 17

49.45 g of camostat mesylate was added in 2.5 kg of 25° C. distilled water (first solvent) and completely dissolved while stirring at 100 rpm. 10.6 g of sodium carbonate (alkalizing agent) was added in 0.1 kg of 25° C. distilled water (first solvent) and completely dissolved while stirring at 100 rpm. The camostat mesylate solution was filtered using a 0.45 μm filter to remove possible foreign substances. The filtered camostat mesylate solution was added and mixed with a sodium carbonate solution, and stirred at 100 rpm for 30 minutes. When the mixed solution became sufficiently opaque, the reactant was filtered using a vacuum pump and a paper filter to remove the solvent, and then dried at 25° C. for one day using a vacuum dryer to obtain camostat in the form of dry powder. In addition, 32.71 g of niclosamide was added in 1.6 kg of 30° C. anhydrous ethanol (second solvent) and completely dissolved while stirring at 100 rpm and then filtered using a 0.45 μm filter to remove possible foreign substances. The obtained camostat was added to the filtered niclosamide solution and stirred at 100 rpm for 3 hours at 25° C. Thereafter, the reactant was filtered using a vacuum pump and a paper filter to remove the solvent, and then dried at 25° C. for one day using a vacuum dryer to obtain a cocrystal β in the form of dry powder.

Examples 18 to 20

Cocrystals β of Examples 18 to 20 were prepared using substantially the same method as the preparation method of Example 17, but using components and contents shown in Table 3 below.

TABLE 3

| Classification | Niclosamide | Camostat mesylate | Alkalizing agent | First solvent | Second solvent |
| --- | --- | --- | --- | --- | --- |
| Example 17 | 32.71 g | 49.45 g | $Na_2CO_3$ 10.6 g | Distilled water 2.6 kg | Anhydrous ethanol 1.6 kg |

TABLE 3-continued

| Classification | Niclosamide | Camostat mesylate | Alkalizing agent | First solvent | Second solvent |
|---|---|---|---|---|---|
| Example 18 | 32.71 g | 49.45 g | NaOH 3.9 g | Distilled water 2.6 kg | Anhydrous ethanol 1.6 kg |
| Example 19 | 32.71 g | 49.45 g | KOH 5.6 g | Distilled water 2.6 kg | Anhydrous ethanol 1.6 kg |
| Example 20 | 32.71 g | 49.45 g | NaHCO$_3$ 8.4 g | Distilled water 2.6 kg | Anhydrous ethanol 1.6 kg |

<Examples 21 to 24> Preparation of Cocrystal γ

In one Example of the present invention, a cocrystal γ according to the present invention was prepared through a slurry method. The contents of niclosamide and camostat mesylate, the type and content of alkalizing agent, and the types and contents of first and second solvents were applied as shown in Table 4 below.

Example 21

49.45 g of camostat mesylate was added in 2.5 kg of 25° C. distilled water (first solvent) and completely dissolved while stirring at 100 rpm. 8.4 g of sodium bicarbonate was added in 0.1 kg of 25° C. distilled water (first solvent) and completely dissolved while stirring at 100 rpm. The camostat mesylate solution was filtered using a 0.45 μm filter to remove possible foreign substances. The filtered camostat mesylate solution was added and mixed with a sodium bicarbonate solution, and stirred at 100 rpm for 30 minutes. When the mixed solution became sufficiently opaque, the reactant was filtered using a vacuum pump and a paper filter to remove the solvent, and then dried at 25° C. for one day using a vacuum dryer to obtain camostat in the form of dry powder. In addition, 32.71 g of niclosamide was added in 1.6 kg of 30° C. acetone (second solvent) and completely dissolved while stirring at 100 rpm and then filtered using a 0.45 μm filter to remove possible foreign substances. The obtained camostat was added to the filtered niclosamide solution and stirred at 100 rpm for 3 hours at 25° C. Thereafter, the reactant was filtered using a vacuum pump and a paper filter to remove the solvent, and then dried at 25° C. for one day using a vacuum dryer to obtain a cocrystal γ in the form of dry powder.

Examples 22 to 24

Cocrystals γ of Examples 22 to 24 were prepared using substantially the same method as the preparation method of Example 21, but using components and contents shown in Table 4 below.

<Examples 25 to 28> Preparation of Cocrystal δ

In one Example of the present invention, a cocrystal δ according to the present invention was prepared through a slurry method. The contents of niclosamide and camostat mesylate, the type and content of alkalizing agent, and the types and contents of first solvent, second solvent, third solvent, and fourth solvent were applied as shown in Table 5 below.

Example 25

49.45 g of camostat mesylate was added in 2.5 kg of 25° C. distilled water (first solvent) and completely dissolved while stirring at 100 rpm. 8.4 g of sodium bicarbonate (alkalizing agent) was added in 0.1 kg of 25° C. distilled water (first solvent) and completely dissolved while stirring at 100 rpm. In addition, 32.71 g of niclosamide was added in 1.6 kg of 30° C. acetone (second solvent) and completely dissolved while stirring at 100 rpm. The camostat mesylate solution and the niclosamide solution were filtered using a 0.45 μm filter to remove possible foreign substances. The filtered camostat mesylate solution was added and mixed with a sodium carbonate solution, and stirred at 100 rpm for 30 minutes. When the mixed solution became sufficiently opaque, the filtered niclosamide solution was added and stirred at 100 rpm for 3 hours. Thereafter, the reactant was filtered using a vacuum pump and a paper filter to remove the solvent, and then dried at 30° C. for one day using a vacuum dryer to obtain a cocrystal raw material in the form of dry powder. The obtained cocrystal raw material was added in 1.6 kg of 25° C. anhydrous ethanol (third solvent) and stirred at 100 rpm for 3 hours. Thereafter, the reactant was filtered using a vacuum pump and a paper filter to remove the solvent, and then dried at 25° C. for one day using a vacuum dryer to obtain a cocrystal raw material in the form of dry powder. The obtained cocrystal raw material was added in 1.6 kg of 25° C. acetonitrile (fourth solvent) and stirred at 100 rpm for 3 hours. Thereafter, the reactant was filtered using a vacuum pump and a paper filter to

TABLE 4

| Classification | Niclosamide | Camostat mesylate | Alkalizing agent | First solvent | Second solvent |
|---|---|---|---|---|---|
| Example 21 | 32.71 g | 49.45 g | NaHCO$_3$ 8.4 g | Distilled water 2.6 kg | Acetone 1.6 kg |
| Example 22 | 32.71 g | 49.45 g | NaOH 3.9 g | Distilled water 2.6 kg | Acetone 1.6 kg |
| Example 23 | 32.71 g | 49.45 g | KOH 5.6 g | Distilled water 2.6 kg | Acetone 1.6 kg |
| Example 24 | 32.71 g | 49.45 g | Na$_2$CO$_3$ 8.4 g | Distilled water 2.6 kg | Acetone 1.6 kg | remove the solvent, and then dried at 25° C. for one day using a vacuum dryer to obtain a cocrystal S in the form of dry powder.

Examples 26 to 28

Cocrystals δ of Examples 26 to 28 were prepared using substantially the same method as the preparation method of Example 25, but using components and contents shown in Table 5 below.

TABLE 5

| Classification | Niclosamide | Camostat mesylate | Alkalizing agent | First solvent | Second solvent | Third solvent | Fourth solvent |
|---|---|---|---|---|---|---|---|
| Example 25 | 32.71 g | 49.45 g | NaHCO$_3$ 8.4 g | Distilled water 2.6 kg | Acetone 2.0 kg | Anhydrous ethanol 1.6 kg | Acetonitrile 1.6 kg |
| Example 26 | 32.71 g | 49.45 g | Na$_2$CO3 10.5 g | Distilled water 2.6 kg | Acetone 2.0 kg | Anhydrous ethanol 1.6 kg | Acetonitrile 1.6 kg |
| Example 27 | 32.71 g | 49.45 g | NaHCO$_3$ 8.4 g | Distilled water 2.6 kg | Anhydrous ethanol 2.0 kg | Anhydrous ethanol 1.6 kg | Acetonitrile 1.6 kg |
| Example 28 | 32.71 g | 49.45 g | Na$_2$CO$_3$ 10.5 g | Distilled water 2.6 kg | Anhydrous ethanol 2.0 kg | Anhydrous ethanol 1.6 kg | Acetonitrile 1.6 kg |

<Examples 29 to 32> Preparation of Cocrystal δ

In one Example of the present invention, a cocrystal S according to the present invention was prepared through a slurry method. The contents of niclosamide and camostat mesylate, the type and content of alkalizing agent, and the types and contents of first and second solvents were applied as shown in Table 6 below.

Example 29

49.45 g of camostat mesylate was added in 2.5 kg of 25° C. distilled water (first solvent) and completely dissolved while stirring at 100 rpm. 8.4 g of sodium carbonate (alkalizing agent) was added in 0.1 kg of 25° C. distilled water (first solvent) and completely dissolved while stirring at 100 rpm. The camostat mesylate solution was filtered using a 0.45 μm filter to remove possible foreign substances. The filtered camostat mesylate solution was added and mixed with a sodium carbonate solution, and stirred at 100 rpm for 30 minutes. When the mixed solution became sufficiently opaque, the reactant was filtered using a vacuum pump and a paper filter to remove the solvent, and then dried at 25° C. for one day using a vacuum dryer to obtain camostat in the form of dry powder. Then, 32.71 g of niclosamide was added to 1.6 kg of 30° C. acetonitrile (second solvent), and added with the obtained camostat, and stirred at 100 rpm for 3 hours. Thereafter, the reactant was filtered using a vacuum pump and a paper filter to remove the solvent, and then dried at 30° C. for one day using a vacuum dryer to obtain a cocrystal S in the form of dry powder.

Examples 30 to 32

Cocrystals δ of Examples 30 to 32 were prepared using substantially the same method as the preparation method of Example 29, but using components and contents shown in Table 6 below.

TABLE 6

| Classification | Niclosamide | Camostat mesylate | Alkalizing agent | First solvent | Second solvent |
|---|---|---|---|---|---|
| Example 29 | 32.71 g | 49.45 g | Na$_2$CO$_3$ 8.4 g | Distilled water 2.6 kg | Acetonitrile 1.6 kg |
| Example 30 | 32.71 g | 49.45 g | NaOH 3.9 g | Distilled water 2.6 kg | Acetonitrile 1.6 kg |
| Example 31 | 32.71 g | 49.45 g | KOH 5.6 g | Distilled water 2.6 kg | Acetonitrile 1.6 kg |
| Example 32 | 32.71 g | 49.45 g | NaHCO$_3$ 8.4 g | Distilled water 2.6 kg | Acetonitrile 1.6 kg |

<Examples 33 to 40> Preparation of Cocrystal ε

In one Example of the present invention, a cocrystal ε according to the present invention was prepared through a slurry method. The contents of niclosamide, camostat mesylate, and meglumine, the type and content of alkalizing agent, and the types and contents of first solvent, second solvent and third solvent were applied as shown in Table 7 below.

Example 33

49.45 g of camostat mesylate was added in 2.5 kg of 25° C. distilled water (first solvent) and completely dissolved while stirring at 100 rpm. 10.5 g of sodium carbonate was added in 0.1 kg of 25° C. distilled water (first solvent) and completely dissolved while stirring at 100 rpm. In addition, 32.71 g of niclosamide was added in 2.0 kg of 30° C. anhydrous ethanol (second solvent) and completely dissolved while stirring at 100 rpm. The camostat mesylate solution and the niclosamide solution were filtered using a 0.45 μm filter to remove possible foreign substances. The filtered camostat mesylate solution was added and mixed with a sodium carbonate solution, and stirred at 100 rpm for 30 minutes. When the mixed solution became sufficiently opaque, the filtered niclosamide solution was added and stirred at 100 rpm for 3 hours. Thereafter, the reactant was filtered using a vacuum pump and a paper filter to remove the solvent, and then dried at 30° C. for one day using a vacuum dryer to obtain a cocrystal raw material in the form of dry powder. The obtained cocrystal raw material was added to 1.6 kg of 25° C. acetonitrile (third solvent) together with 97.6 g of meglumine (co-former), and then stirred at 100 rpm for 3 hours. Thereafter, the reactant was filtered using a vacuum pump and a paper filter to remove the solvent, and then dried at 20° C. for one day using a vacuum dryer to obtain a cocrystal ε in the form of dry powder.

Examples 34 to 40

Cocrystals ε of Examples 34 to 40 were prepared using substantially the same method as the preparation method of Example 33, but using components and contents shown in Table 7 below.

TABLE 7

| Classification | Niclosamide | Camostat mesylate | Co-former | Alkalizing agent | First solvent | Second solvent | Third solvent |
|---|---|---|---|---|---|---|---|
| Example 33 | 32.71 g | 49.45 g | Meglumine 97.6 g | $Na_2CO_3$ 10.5 g | Distilled water 2.6 kg | Anhydrous ethanol 2.0 kg | Acetonitrile 1.6 kg |
| Example 34 | 32.71 g | 49.45 g | Meglumine 97.6 g | NaOH 3.9 g | Distilled water 2.6 kg | Anhydrous ethanol 2.0 kg | Acetonitrile 1.6 kg |
| Example 35 | 32.71 g | 49.45 g | Meglumine 39.0 g | KOH 5.6 g | Distilled water 2.6 kg | Anhydrous ethanol 2.0 kg | Acetonitrile 1.6 kg |
| Example 36 | 32.71 g | 49.45 g | Nicotinamide 12.2 g | $NaHCO_3$ 8.4 g | Distilled water 2.6 kg | Anhydrous ethanol 2.0 kg | Acetonitrile 1.6 kg |
| Example 37 | 32.71 g | 49.45 g | Nicotinamide 36.6 g | $NaHCO_3$ 8.4 g | Distilled water 2.6 kg | Anhydrous ethanol 2.0 kg | Acetonitrile 1.6 kg |
| Example 38 | 32.71 g | 49.45 g | Caffeine 19.4 g | $NaHCO_3$ 8.4 g | Distilled water 2.6 kg | Anhydrous ethanol 2.0 kg | Acetonitrile 1.6 kg |
| Example 39 | 32.71 g | 49.45 g | Arginine 17.4 g | $NaHCO_3$ 8.4 g | Distilled water 2.6 kg | Anhydrous ethanol 2.0 kg | Acetonitrile 1.6 kg |
| Example 40 | 32.71 g | 49.45 g | Citric acid 19.2 g | $NaHCO_3$ 8.4 g | Distilled water 2.6 kg | Anhydrous ethanol 2.0 kg | Acetonitrile 1.6 kg |

The production yields of the cocrystals of the present invention prepared in Examples 1 to 40 were all 70% or more, and the purities thereof were at least 95% or more.

Hereinafter, analysis experiments and results of the cocrystals α, β, γ, δ, and ε prepared in Examples 1, 17, 21, 25, and 33 will be described in more detail.

EXPERIMENTAL EXAMPLES

Each cell line used in an experiment was purchased and used from the American Type Culture Collection (ATCC) or Korea Cell Line Bank (KCLB).

Experimental Example 1. Powder X-Ray Diffraction (PXRD) Analysis

With respect to cocrystal samples according to Examples 1, 17, 21, 25 and 33 of the present invention and comparative samples (niclosamide, camostat, and camostat mesylate), PXRD analysis was performed under the following conditions using D8 ADVANCE with Davinci (trade name, Bruker AXS Inc, GmbH, Germany) as a powder X-ray diffraction (PXRD) analyzer.

Detector: High-speed LynxEye detector
Tube: Cu
Tube current: 40 mA
Tube voltage: 40 kV
Sampling width: 0.020°
Scanning rate: 0.1 sec/step
Wavelength: 1.54056 Å
Measured diffraction angle range (2θ): 2.5 to 40°

The cocrystal samples of the present invention were cocrystals in a dry powder form obtained in Examples 1, 17, 21, 25 and 33, respectively, and the comparative samples were niclosamide, camostat and camostat mesylate, which were the raw materials used to form the cocrystals. The diffraction angles 2θ of main X-ray diffraction patterns through PXRD analysis of the cocrystal samples according to Examples 1, 17, 21, 25 and 33 of the present invention and the comparative samples represented relative intensities in Tables 8 and 9 below.

TABLE 8

| Niclosamide | | Camostat mesylate | | Camostat | |
|---|---|---|---|---|---|
| Diffraction angle (2θ) | Relative intensity (intensity) | Diffraction angle (2θ) | Relative intensity (intensity) | Diffraction angle (2θ) | Relative intensity (intensity) |
| 12.9444 | 227 | 9.61405 | 550 | 7.30839 | 725 |
| 13.6933 | 282 | 12.2153 | 289 | 12.4715 | 565 |
| 19.7629 | 204 | 13.2992 | 107 | 12.905 | 267 |
| 22.1277 | 115 | 14.383 | 139 | 14.7377 | 187 |
| 23.3298 | 156 | 15.1122 | 161 | 15.8216 | 179 |
| 25.596 | 493 | 16.531 | 244 | 16.5507 | 314 |
| 26.2266 | 236 | 17.1222 | 648 | 17.4769 | 395 |
| 26.6799 | 452 | 19.9403 | 287 | 19.6447 | 664 |
| | | 20.4329 | 1041 | 22.0686 | 399 |
| | | 20.7482 | 1065 | 23.6254 | 306 |
| | | 21.6547 | 369 | 24.0983 | 475 |
| | | 23.5268 | 201 | 24.8669 | 241 |
| | | 24.1574 | 303 | 26.1675 | 206 |
| | | 28.3155 | 406 | 26.5813 | 436 |
| | | | | 27.6258 | 201 |

TABLE 9

| Cocrystal α (Example 1) | | Cocrystal β (Example 17) | | Cocrystal γ (Example 21) | | Cocrystal δ (Example 25) | |
|---|---|---|---|---|---|---|---|
| Diffraction angle (2θ) | Relative intensity (intensity) | Diffraction angle (2θ) | Relative intensity (intensity) | Diffraction angle (2θ) | Relative intensity (intensity) | Diffraction angle (2θ) | Relative intensity (intensity) |
| 5.37715 | 907 | 6.55954 | 1746 | 7.82075 | 145 | 6.81572 | 454 |
| 7.38721 | 138 | 10.7176 | 193 | 8.35283 | 97 | 7.46604 | 613 |
| 9.41698 | 131 | 13.8509 | 184 | 8.80608 | 68 | 9.87023 | 249 |
| 10.6979 | 177 | 15.2501 | 171 | 11.3876 | 331 | 12.3532 | 558 |
| 13.1612 | 173 | 16.6296 | 151 | 16.0975 | 228 | 12.8262 | 149 |
| 15.1122 | 270 | 18.147 | 290 | 16.6493 | 397 | 13.24 | 423 |
| 17.7134 | 150 | 18.9943 | 317 | 18.679 | 185 | 18.6396 | 404 |
| 18.2258 | 236 | 19.5855 | 493 | 19.0929 | 125 | 22.6795 | 185 |
| 18.7579 | 235 | 20.9059 | 156 | 22.6992 | 134 | 23.259 | 162 |
| 20.0782 | 146 | 21.3591 | 191 | 23.0539 | 272 | 24.7881 | 194 |
| 20.3344 | 222 | 22.3642 | 160 | 23.9013 | 436 | 25.6946 | 227 |
| 21.0044 | 126 | 24.3151 | 170 | 24.4333 | 399 | 27.5667 | 191 |
| 21.97 | 144 | 24.8866 | 165 | 25.4975 | 141 | | |
| 24.3939 | 126 | 26.8178 | 425 | 26.9755 | 132 | | |
| 25.1034 | 139 | 27.7637 | 156 | 29.2417 | 111 | | |
| 25.596 | 261 | | | 29.7344 | 200 | | |
| 26.069 | 306 | | | 30.3256 | 132 | | |
| 26.4434 | 178 | | | | | | |
| 27.882 | 156 | | | | | | |

| Crystal ε (Example 33) | |
|---|---|
| Diffraction angle (2θ) | Relative intensity (intensity) |
| 7.0522 | 330 |
| 7.6239 | 340 |
| 9.06226 | 4975 |

TABLE 9-continued

| | |
|---|---|
| 12.4912 | 370 |
| 18.009 | 644 |
| 21.9897 | 361 |
| 24.2166 | 213 |
| 27.1134 | 187 |

In FIG. 1, an x-axis was 2θ (Bragg angle, unit: °) and a y-axis was an X-ray intensity (cps).

Referring to Tables 8 and 9 and FIG. 1 together, in a process of forming cocrystals of co-formers, there was non-stoichiometric hydrate, and as a result, it was confirmed that a discrepancy occurred at a far distance, and a phenomenon in which the diffraction angle 2θ was shifted occurred. That is, as compared with each of niclosamide, camostat mesylate and camostat in FIG. 1, it was confirmed that the cocrystals of the present invention exhibit novel crystals showing diffraction patterns different from those of the raw materials.

Experimental Example 2. Differential Scanning Calorimetry (DSC) Analysis

Differential scanning calorimetry was performed on niclosamide, camostat mesylate, camostat, and cocrystals prepared in Examples 1, 17, 21, 25 and 33.

For the analysis according to temperature differential scanning calorimetry, a DSC Q2000 System (trade name, TA Instrument, USA) was used as a DSC analysis device, and the measurement was performed while the temperature was increased from 0° C. to a melting point at a heating rate of 10° C./min. During the measurement, $N_2$ gas was supplied at a rate of 50 mL/min, and the measurement was performed in an aluminum sample pan. Data were analyzed using Universal Analysis 2000 software (trade name, TA instruments, USA). The maximum endothermic peak temperatures of monocomponents niclosamide and camostat, and fusion crystals thereof obtained through DSC analysis were shown in Table 10 and FIG. 2 below.

of the present invention exhibit novel crystals exhibiting new thermodynamic characteristics different from those of the raw materials.

Experimental Example 3. Evaluation of Solubility of Niclosamide in Cocrystal of the Present Invention The solubility of a niclosamide single material and the solubility of niclosamide included in the cocrystals prepared in Examples 17 and 33 of the present invention were measured in a pH 7 buffer solution and compared with each other. A pH 7 solution prepared by mixing 0.1 N potassium phosphate and 0.1 N sodium hydroxide was used as the pH 7 buffer solution. At room temperature, 5 mg of the niclosamide single material, 5 mg of the cocrystal β of Example 17, and 5 mg of the cocrystal ε of Example 33 were added to 25 ml of the prepared pH solution, respectively, and stirred at 600 rpm. After 1 hour of stirring, 5 ml of a supernatant was filtered with a 0.45 μm PVDF filter, and then the amount of dissolved niclosamide was evaluated using the filtered solution as a sample.

HPLC instrument conditions were a flow rate of 1.5 ml/min, an injection volume of 100 μl, a detection wavelength of 287 nm, and a column oven temperature of 25° C., and a mobile phase A was a pH 6 buffer (potassium phosphate 2 g/L, disodium phosphate 1 g/L, tetrabutylammonium hydrogen sulfate 2 g/L, adjusted to pH 6.0±0.05 with 1 M NaOH), and a mobile phase B was acetonitrile. Mobile phase conditions were shown in Table 11 below.

TABLE 10

| | |
|---|---|
| Maximum endothermic peak temperature (° C.) of niclosamide | Maximum endothermic peak temperature (°C) of camostat mesylate |
| 230.06 | 194.85 |
| Maximum endothermic peak temperature (° C.) of camostat free base | Example 1 - Maximum endothermic peak temperature (° C.) of Cocrystal α |
| 176.13 | 144.38 |
| Example 17 - Maximum endothermic peak temperature (° C.) of Cocrystal β | Example 21 - Maximum endothermic peak temperature (° C.) of Cocrystal γ |
| 126.35 | 182.74 |
| Example 25 - Maximum endothermic peak temperature (° C.) of Cocrystal δ | Example 33 - Maximum endothermic peak temperature (° C.) of Cocrystal ε |
| 151.69 | 126.03 |

Figure 2:
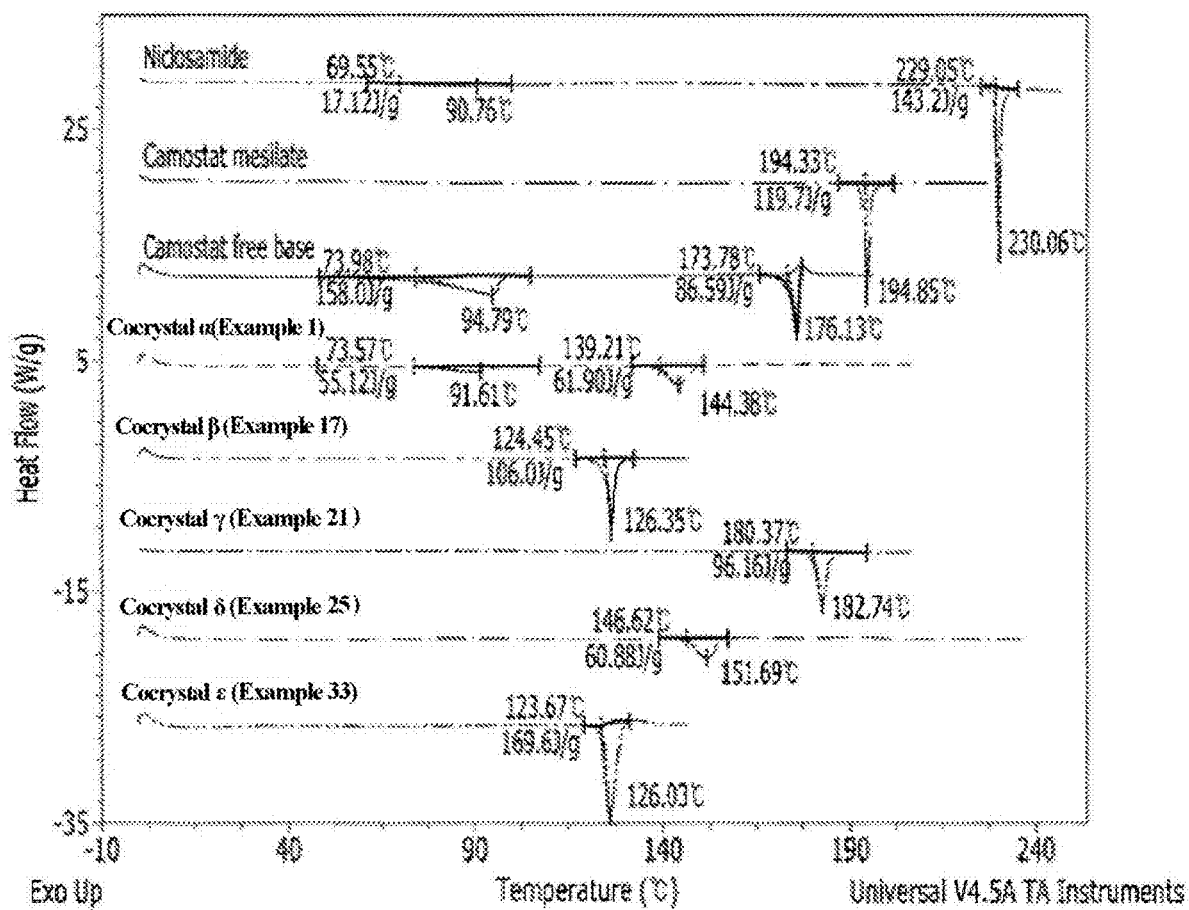
FIG. 2 is a differential scanning calorimetry (DSC) analysis result of niclosamide, camostat mesylate, camostat, and cocrystals α, β, γ, δ, and ε of the present invention.

In FIG. 2, an x-axis represents a temperature (unit: ° C.), and a y-axis represents a heat flow (unit: W/g).

Referring to Table 10 together with FIG. 2, when the heating rate is 10° C./min, it may be confirmed that the cocrystal α shows a DSC endothermic peak at 144.38° C., the cocrystal β shows a DSC endothermic peak at 126.35° C., the cocrystal γ shows a DSC endothermic peak at 182.74° C., the cocrystal δ shows a DSC endothermic peak at 151.69° C., and the cocrystal ε shows a DSC endothermic peak at 126.03° C.

That is, as compared with each of niclosamide, camostat mesylate and camostat, it was confirmed that the cocrystals

TABLE II

| Time (min) | Mobile phase A (%) | Mobile phase B (%) |
|---|---|---|
| 0 | 90 | 10 |
| 13 | 90 | 10 |
| 18 | 45 | 55 |
| 25 | 45 | 55 |
| 30 | 90 | 10 |
| 40 | 90 | 10 |

Referring to Table 12 below, niclosamide was hardly detected due to its low solubility at pH 7, and in the cocrystal of Example 17, it was confirmed that 55.2 µg/ml of niclosamide was dissolved, so that the solubility of niclosamide was significantly improved compared to the niclosamide single material. In addition, even in the cocrystal of Example 33, it was confirmed that 0.4 µg/ml of niclosamide was dissolved, and the solubility of niclosamide was improved compared to the niclosamide single material.

TABLE 12

| Drug | Niclosamide | Example 17 | Example 33 |
|---|---|---|---|
| pH 7 solubility (µg/ml) | <0.3 µg/ml | 55.2 µg/ml | 0.4 µg/ml |

Experimental Example 4. Evaluation of Artificial Membrane Permeability of Camostat in Cocrystal of the Present Invention The artificial membrane permeability of camostat in the cocrystal prepared in Example 21 of the present invention was evaluated using a side-bi-side cell system and compared with that of a camostat single material. As an artificial membrane, 200 µl of a GIT-0-Lipid solution was used by dropping on the center of a 25 mm hydrophobic PVDF membrane. 5 ml of a 37° C. pH 5.0 FeSSIF solution was taken and contained in a donor cell, and 20 mg of the sample was weighed and administered to the donor cell. The test was started after adding 5 ml of an ethyl alcohol. pH 7.4 PBS buffer (1:9, v/v) solution to an acceptor cell, and 200 µl of the solution was taken five times from the acceptor cell every predetermined time and used as a test solution. Then, the acceptor cell was filled with 1 ml of the ethyl alcohol: pH 7.4 PBS buffer (1:9, v/v) solution to maintain a total volume of 5 ml.

TABLE 13

| Drug | Camostat | Example 21 |
|---|---|---|
| Cumulative permeation amount J (µg/ml/cm$^2$/h) | 561.89 | 876.26 |

Referring to Table 13, it was confirmed that a cumulative permeation amount of camostat single material was 561.89, and the cumulative permeation amount of camostat in the cocrystal of Example 21 was 876.29, so that the cumulative permeation amount of camostat was 1.56-fold better.

That is, it was confirmed that the cocrystal of the present invention had excellent membrane permeability to have excellent absorption in vivo.

Experimental Example 5. Evaluation of Artificial Membrane Permeability of Niclosamide in Cocrystal of the Present Invention The permeability of an artificial membrane (barrier membrane from PermeaPad, 25 mm) to niclosamide of the cocrystal of Example 17 of the present invention was evaluated using the side-bi-side cell system, and compared with that of the niclosamide single material. 5 ml of an FeSSIF solution (37° C.) at pH 6.5 added with 3% (w/w) Kolliphor ELP was taken and contained in a donor cell, and 2θ mg of each sample was weighed and administered to the donor cell. 5 ml of a PBS solution of pH 7.4 added with 20% (w/w) HP-β-CD was added to the acceptor cell, the test was started, and 200 µl of the solution was taken 5 times from the acceptor cell every predetermined time and used as the test solution. Then, the acceptor cell was filled with the PBS solution of pH 7.4 added with 1 ml of 20% (w/w) HP-p-CD, and the total volume was maintained at 5 ml.

TABLE 14

| Drug | Niclosamide | Example 17 |
|---|---|---|
| Cumulative permeation amount of drug (µg/ml/cm$^2$/h) | 1.18 | 2.03 |

Referring to Table 14, it was confirmed that a cumulative permeation amount of niclosamide single material was 1.18, and the cumulative permeation amount of niclosamide in the cocrystal of Example 17 was 2.03, so that the cumulative permeation amount of niclosamide of the cocrystal of the present invention was 1.72-fold better.

That is, it was confirmed that the cocrystal of the present invention had excellent membrane permeability to have excellent absorption in vivo.

Experimental Example 6. Evaluation of Inhibition of Cancer Cell Proliferation

Cell proliferation inhibition was evaluated to verify the anticancer efficacy of the cocrystals of the present invention in pancreatic cancer, breast cancer, non-small cell lung cancer, and liver cancer cell lines.

The conditions of an anticancer in vitro drug efficacy test for the evaluation of proliferation inhibition by the cocrystals of the present invention in each cancer cell line were shown in Table 15 below. Hereinafter, the cocrystal α was the cocrystal prepared in Example 1.

$2 \times 10^3$ to $4 \times 10^3$ cells per well were inoculated in a 96-tissue culture plate using total 8 types of cell lines including two pancreatic cancer cell lines PANC-1 and MIAPACA-2, two breast cancer cell lines MCF-7 and MDA-MB-231, two non-small cell lung cancer cell lines A-549 and H-1299, and two liver cancer cell lines Hep-3B and Huh-7. The cells were incubated in a cell incubator for 24 hours, and then treated with each cocrystal drug at a total of six concentrations of 0.3, 3, 3°, 30°, 3000, and 30000 ng/mL. After 48 hours of drug treatment, a reagent was reacted for 1 to 4 hours using a CCK-8 assay kit to observe color changes, and the cell viability was measured by measuring absorbance at a wavelength of 450 nm with a microreader.

TABLE 15

| Cell line | Pancreatic cancer cell lines PANC-1, MIAPACA-2 Breast cancer cell line MCF-7, MDA-MB-231 Non-small cell lung cancer cell lines A-549, H-1299 Liver cancer cell line Hep-3B, Hub-7 |
|---|---|
| Cell number | $2 \times 10^3$ to $4 \times 10^3$ cells/well, 96 well plate |
| Incubation condition | 96 well plate, 24 hr incubation |

TABLE 15-continued

| | |
|---|---|
| Drug concentration | 0.3 to 30000 ng/mL (10 serial dilution in DMSO, 6 point) |
| Medium | DMEM (Dulbecco Modified Eagle Medium), RPMI (Roswell Park Memorial Institute) 1640, MEM (Minimum Essential Media) |

In order to verify the anticancer efficacy of cocrystals for various types of cancer cells, the cell viability was measured in pancreatic cancer, breast cancer, non-small cell lung cancer, and liver cancer cells to derive $IC_{50}$. The results were shown in Table 16 below.

The $IC_{50}$ values of positive controls were based on facts described in the literatures below, respectively.

Gemcitabine: HONGGANG WANG, BEVERLY R. WORD and BEVERLY D. LYN-COOK: Enhanced Efficacy of Gemcitabine by Indole-3-carbinol in Pancreatic Cell Lines: The Role of Human Equilibrative Nucleoside Transporter 1. Anticancer research 31 (10): 3171-3180, 2011.

Gefitinib: CHI PAN, HUUIE DUAN, YINAN WU, CHUNPENG ZHU, CHENGHAO YI, YIN DUAN, DEMIN LU, CHENG GUO, DEQI WU, YANYAN WANG, XIANHUA FU, JING XU, YLDING CHEN, MENG LUO, WEI TIAN, TAO PAN, WENHONG XU, SUZHAN ZHANG and JIANJIN HUANG: Inhibition of DNA-PK by gefitinib causes synergism between gefitinib and cisplatin in NSCLC. International journal of oncology 57:939-955, 2020

Docetaxel: Aliakbar Taherian, 1Tahereh Mazoochi: Different Expression of Extracellular Signal-Regulated Kinases (ERK) 1/2 and Phospho-Erk Proteins in MBA-MB-231 and MCF-7 Cells after Chemotherapy with Doxorubicin or Docetaxel. Iranian Journal of basic Medical sciences 15, 669-677, 2012

Sorafenib: Y-C Shen 1, D-L Ou, C Hsu, K-L Lin, C-Y Chang, C-Y Lin, S-H Liu, A-L Cheng: Activating oxidative phosphorylation by a pyruvate dehydrogenase kinase inhibitor overcomes sorafenib resistance of hepatocellular carcinoma. BJC 108, 72-81, 2013

TABLE 16

| | $IC_{50}$ (nM) | | |
|---|---|---|---|
| cell line | Example 1 | Positive control | |
| PANC-1 | 99.30 | Gemcitabine | 42900.00 |
| MiaPaCa-2 | 729.32 | | 92700.00 |
| A-549 | 975.81 | Gefitinib | 13200.00 |
| H-1299 | 381.13 | | 17500.00 |
| MCF-7 | 427.86 | Docetaxel | 763.00 |
| MDA-MB-231 | 126.31 | | 635.00 |
| Hep-3B | 41.33 | Sorafenib | 12300.00 |
| Huh-7 | 134.45 | | 6000.00 |

Referring to Table 16 above, it was confirmed that the $IC_{50}$ of the cocrystal of Example 1 according to the present invention was 99.30 nM in PANC-1 cells as a pancreatic cancer cell line; 729.32 nM in MIAPACA-2 cells; 427.86 nM in MCF-7 cells and 126.31 nM in MDA-MB-231 cells as a breast cancer cell line; 975.81 nM in A-549 cells and 381.13 nM in H-1299 cells as a non-small cell lung cancer cell line; and 41.33 nM in Hep-3B cells and 134.45 nM in Huh-7 cells as a liver cancer cell line.

Through this, the $IC_{50}$ value of the cocrystal of Example 1 was confirmed in a total of 8 types of cell lines, every two types of pancreatic cancer, breast cancer, non-small cell lung cancer, and liver cancer cell lines, and in a pancreatic cancer cell line that has been classified as incurable carcinoma and has no therapeutic agent, a low $IC_{50}$ value was confirmed to be effectively applied to inhibit the growth of pancreatic cancer cells. In addition, under the corresponding test conditions, low $IC_{50}$ values were also confirmed in breast cancer, non-small cell lung cancer and liver cancer cell lines, and as a result, the cancer cell growth inhibitory effect of the cocrystal of the present invention was confirmed.

In addition, in order to compare the $IC_{50}$ of the positive control and the cocrystal of Example 1, with respect to a drug, gemcitabine used as a therapeutic agent for pancreatic cancer patients, a drug, gefitinib used as a therapeutic agent for non-small cell lung cancer patients, a drug, docetaxel used as a therapeutic agent for breast cancer patients, and a drug, sorafenib used as a therapeutic agent for liver cancer patients, the $IC_{50}$ was confirmed through the literatures. As compared with the positive control drugs, it was confirmed that the cocrystal of Example 1 of the present invention showed a significantly lower $IC_{50}$ value than the positive control drug in all cell lines. The $IC_{50}$ of the cocrystal of the present invention was 432-fold lower in the PANC-1 cell line and 127-fold lower in the MIAPACA-2 cell line than gemcitabine. In addition, the $IC_{50}$ of the cocrystal was 13-fold lower in the A-549 cells and 45-fold lower in the H-1299 cells than gefitinib. In addition, the $IC_{50}$ of the cocrystal was 1.7-fold lower in the MCF-7 cells and 5-fold lower in the MDA-MB-231 cells than docetaxel. In addition, the $IC_{50}$ of the cocrystal was 297-fold lower in the Hep-3B cells and 44-fold lower in the Huh-7 cells than Sorafenib.

That is, it was confirmed that the cocrystal of the present invention had an excellent cancer cell proliferation inhibitory effect compared to conventionally used cancer therapeutic agents.

Experimental Example 7. Comparison and Verification of Anticancer Efficacy of Cocrystal of the Present Invention and Positive Control in Subtype-Specific Breast Cancer Cell Lines In subtype-specific breast cancer cell lines, the cell proliferation inhibition of the cocrystal of the present invention was evaluated, and the conditions of the anticancer in vitro drug efficacy evaluation test for evaluation were shown in Table 17 below.

A total of 19 types of breast cancer cell lines were verified for the cocrystal of the present invention. As a positive control, drugs shown Table 17 below were used. Luminescent cell viability assay was performed using CellTiter glo by setting the cocrystals prepared in Examples 1 and 17 in 8 concentration ranges serially diluted by ½ fold for each cell line. A CellTiter-Glo substrate and a CellTiter-Glo buffer were mixed to make a CellTiter-Glo reagent, and then a CellTiter-Glo reagent was added in the same amount as a cell culture medium (40 µl volume) and left at room temperature for 10 minutes, and then the sensitivity to the formulation was confirmed by a method for measuring ATP using a luminometer (GloMax® Discover Microplate Reader). $IC_{50}$ values were calculated and compared and evaluated by nonlinear regression analysis of GraphPad Prism 9 software.

TABLE 17

| | |
|---|---|
| Cell line | <19 types of breast cancer cell lines><br>Hormone-receptor positive breast cancer: MCF7, ZR-75-1, T47D, BT474<br>HER2-positive breast cancer: SK-BR-3, MDA-MB-453, HCC1954, HCC1419, JMIT1<br>Triple negative breast cancer: HCC1937, HCC1143, MDA-MB-157, MDA-MB-231, Hs578T, HCC38, BT-549<br>Drug-resistant breast cancer: MCF7/ADR; Doxorubicin resistant MCF7 cell line, MCF7/PR; Paclitaxel resistant MCF7 cell line, MCF7/TAMR; Tamoxifen resistant MCF7 cell line |
| Positive control | Hormone-receptor positive breast cancer: Tamoxifen, Docetaxel<br>HER2-positive breast cancer: Herceptin, Docetaxel<br>Triple negative breast cancer: Cisplatin, Docetaxel<br>Drug-resistant breast cancer: Docetaxel |
| Cell number | 0.5 to 1 × $10^3$ cells/well. 384 well plate<br>1 × $10^4$ cells/well, 96 well plate |
| Incubation condition | 10% FBS, 1% PS (including 0.023 U/ml insulin in the case of DMEM culture medium)<br>384 well plate, 24 hr incubation |
| Drug concentration | 0 to 25 μM (1/2 serial dilution in Vehicle, 8 point) |
| Medium | DMEM (Dulbecco Modified Eagle Medium),<br>RPMI (Roswell Park Memorial Institute) 1640,<br>MEM (Minimum Essential Media) |

Figure 3:
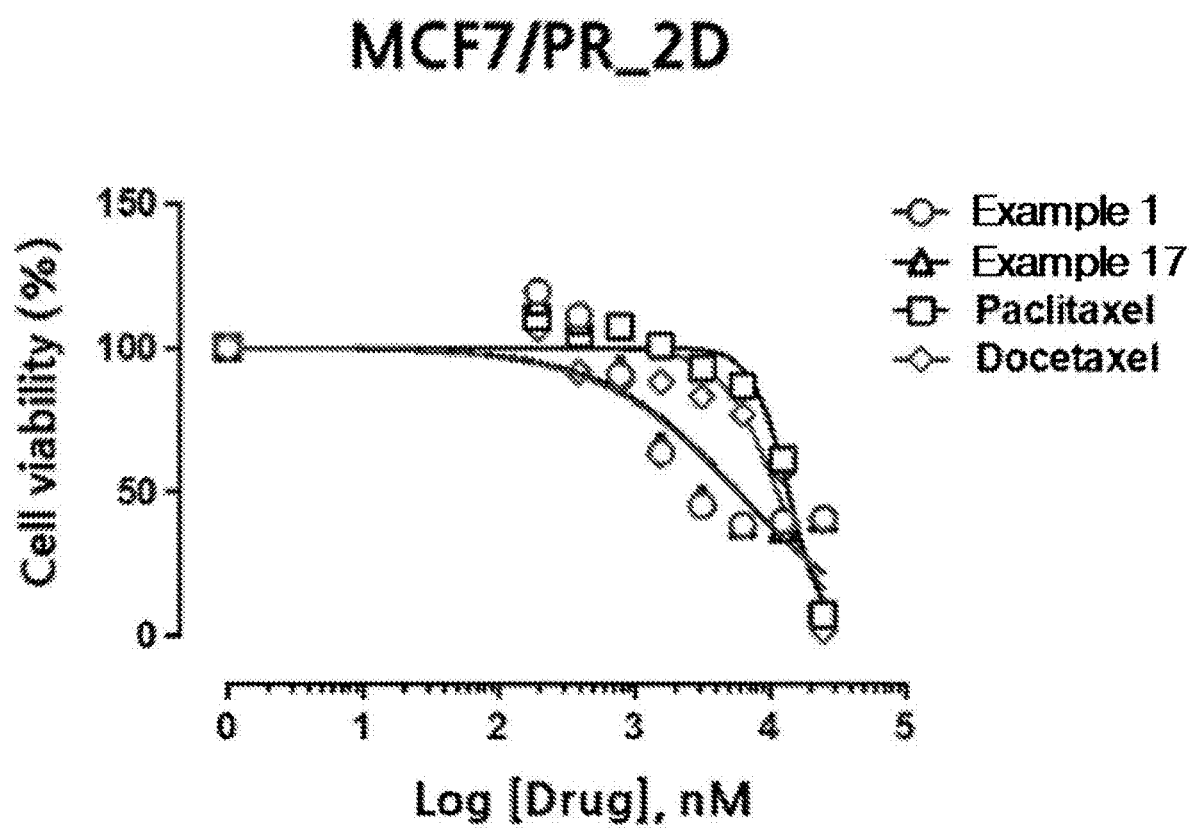
FIG. 3 is a result of evaluating the anticancer efficacy of cocrystals of Examples 1 and 17 and a positive control drug in a paclitaxel-resistant breast cancer cell line.
Figure 4:
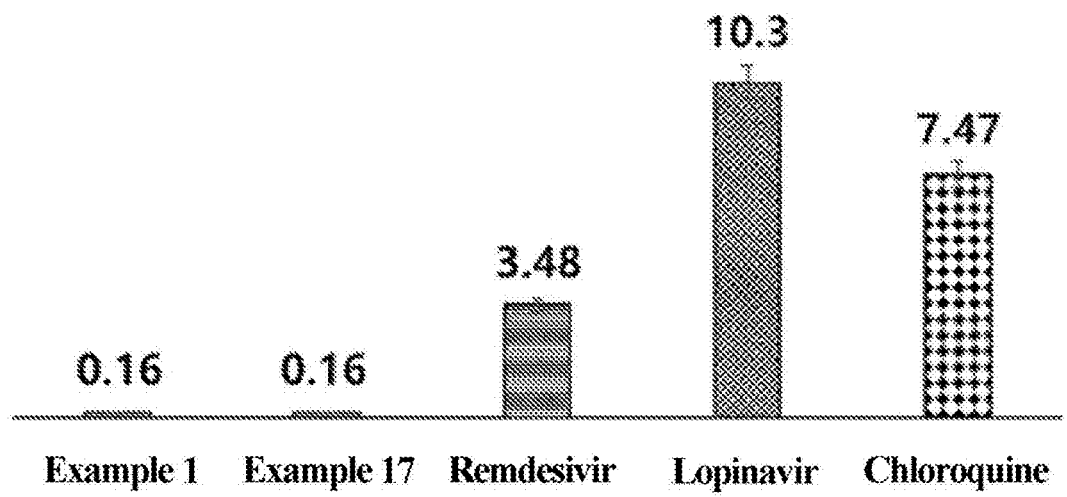
FIG. 4 is a result of evaluating the SARS-CoV-2 antiviral efficacy of cocrystals of Examples 1 and 17 and positive control drugs.

In order to verify the anticancer efficacy of the cocrystal of the present invention for subtype-specific breast cancer cell lines, a dose-response curve test was conducted in a total of 19 types of breast cancer cells, and $IC_{50}$ was derived by measuring the cell viability. The representative results were shown in FIG. 3 and Tables 18 to 21 below.

TABLE 18

Hormone-positive breast cancer cell line

| | Drug $IC_{50}$ (nM) | | | |
|---|---|---|---|---|
| Cells | Example 1 | Example 17 | Tamoxifen | Docetaxel |
| ZR-75-1 | 5366.0 | 6293.0 | 9198.0 | 24242.0 |

TABLE 19

HER2-positive breast cancer cell line

| | Drug $IC_{50}$ (nM) | | | |
|---|---|---|---|---|
| Cells | Example 1 | Example 17 | Herceptin | Docetaxel |
| MDA-MB-453 | 7465.0 | 7484.0 | 25000.0 | 25000.0 |
| HCC1419 | 1272.0 | 1500.0 | 25000.0 | 25000.0 |

TABLE 20

Triple negative breast cancer cell line

| | Drug $IC_{50}$ (nM) | | | |
|---|---|---|---|---|
| Cells | Example 1 | Example 17 | Cisplatin | Docetaxel |
| HCC1937 | 4979.0 | 4546.0 | 12296.0 | 25000.0 |
| MDA-MB-231 | 1747.0 | 2248.0 | 25000.0 | 25000.0 |

TABLE 21

Drug-resistant breast cancer cell line

| | Drug $IC_{50}$ (nM) | | | |
|---|---|---|---|---|
| Cells | Example 1 | Example 17 | Paclitaxel | Docetaxel |
| MCF7/PR | 5691.0 | 5824.0 | 13680.0 | 11406.0 |

* PR (Paclitaxel Resistance)

The drug response was varied for each cell, but in all cell lines, $IC_{50}$ values of Examples 1 and Example 17, and the drugs used as control drugs were secured.

In the case of hormone-positive breast cancer cell lines, it was confirmed that Example 1 and Example 17 exhibited lower $IC_{50}$ values than positive controls Tamoxifen and Docetaxel. In particular, in the case of ZR-75-1 cells, it was confirmed that the $IC_{50}$ value of Example 1 was 1.7-fold lower than Tamoxifen, and the $IC_{50}$ value of Example 17 was 1.4-fold lower than Tamoxifen. As a result, it was confirmed that the cocrystals of Example 1 and Example 17, which were the cocrystals of the present invention, exhibited a better anticancer effect than the positive control drug currently used for hormone-positive breast cancer patients.

In the case of the HER2-positive breast cancer cell line, HCC1419 cells, it was confirmed that Example 1 showed a significantly 19-fold lower $IC_{50}$ value and Example 17 showed a significantly 16-fold lower $IC_{50}$ value than a positive control drug Herceptin. Even in MDA-MB-453 cells, it was confirmed that the cocrystal of the present invention had a significantly low $IC_{50}$ value. That is, it was confirmed that a cell viability reduction effect of the cocrystal of the present invention in HER2-positive breast cancer cell lines was very superior to that of the positive control.

Even in the case of a triple-negative breast cancer cell line, MDA-MB-231 cells, which are most commonly known, showed $IC_{50}$ values 14-fold and 11-fold lower than those of Cisplatin, a positive control drug, in both Examples 1 and 17. Even in the triple-negative breast cancer cell line, which was the most difficult treatment among breast cancers, the anticancer effect of the cocrystal of the present invention, which was very superior to existing therapeutic agents, was confirmed.

$IC_{50}$ values for Examples 1 and 17 and the positive control drugs paclitaxel and docetaxel were confirmed using drug-resistant breast cancer cell lines resistant to the corresponding drugs by long-term exposure to Doxorubicin, Paclitaxel, Tamoxifen, or Herceptin. In the drug-resistant breast cancer cell line, a low $IC_{50}$ value of the cocrystal of Example was confirmed compared to the positive control drug Docetaxel, and particularly, in Paclitaxel-resistant breast cancer cell lines, a representative drug used as a cytotoxic therapeutic agent, Examples 1 and 17 were able to secure 2-fold or more low $IC_{50}$ values.

Experimental Example 8. Comparison and Evaluation of Antiviral Efficacy of Cocrystal of the Present Invention Against SARS-CoV-2 with Positive Control Drugs An experiment was conducted to verify the antiviral efficacy of the cocrystal of the present invention against SARS-CoV-2 using a SARS-CoV-2 cell infection model, and the experimental conditions were shown in Table 22 below. A group treated with each drug, chloroquine, lopinavir, or remdesivir, was used as a positive control.

To verify the antiviral efficacy of the cocrystal of the present invention against SARS-CoV-2, $1.2 \times 10^4$ Vero cells per well were inoculated in a 384-tissue culture plate. After 24 hours, the cells were treated with a cocrystal prepared by serial dilution 2-fold in DMSO at 10 points or a positive control drug at the highest concentration of 50 μM. After about 1 hour of the cocrystal or positive control treatment, the cells were infected with SARS-CoV-2 (provided by the Korea Centers for Disease Control and Prevention (KCDC), 0.125 MOI) in a Biosafety level 3 (BSL3) facility, and incubated at 37° C. for 24 hours. Thereafter, the cells were fixed with 4% paraformaldehyde (PFA) and permeabilized. Then, the cells were stained by treating an anti-SARS-CoV-2 nucleocapsid (N) primary antibody, an Alexa Fluor 488-conjugated goat anti-rabbit IgG secondary antibody, and Hoechst 33342. Fluorescent images of the infected cells were obtained using Operetta (Perkin Elmer), a large-capacity image analysis device.

TABLE 22

| | |
|---|---|
| Cell line | VeroE6 |
| Cell number | $1.2 \times 10^4$ cells/well, 384 well plate |
| Incubation condition | DMEM, 2% FBS, IX Antibiotic-Antimycotic sol in black 384 well, clear plate, 24 hr prior to the experiment |
| Drug concentration | 0.1 to 50 μM (2X serial dilution in DMSO, 10 point) |
| Stock concentration | 10 mM (working top conc. 50 μM |
| Viral infection titration (multiplicity of infection; MOI) | 0.0125 |

4% PFA fixation → permeabilization → $1^{st}$ Ab anti-SARS-CoV-2 nucleocapsid (N) → $2^{nd}$ Ab Alexa Fluor 488-conjugated goat anti-rabbit IgG/Hoechst 33342 staining → Perkin Elmer Immunofluorescence analysis In order to verify the antiviral efficacy of the cocrystal against SARS-CoV-2, a dose-response curve test was conducted in a SARS-CoV-2 cell infection model, and the results were shown in Table 23 below. Selectivity index (SI) values were calculated as $CC_{50}/IC_{50}$.

TABLE 23

| | $IC_{50}$ (μM) | $CC_{50}$ (μM) | SI |
|---|---|---|---|
| Example 1 | 0.16 | >50 | 306 |
| Example 17 | 0.16 | >50 | 313 |

TABLE 23-continued

| | $IC_{50}$ (μM) | $CC_{50}$ (μM) | SI |
|---|---|---|---|
| Remdesivir | 3.48 | >50 | 14.35 |
| Lopinavir | 10.30 | >50 | 4.85 |
| Chloroquine | 7.47 | >150 | 20.08 |

Referring to Table 23, it was confirmed that the cocrystals of Example 1 and Example 17 had $IC_{50}$ of 0.16 μM, $CC_{50}$ of 50 μM or more, and the SI was 306 for the cocrystal of Example 1 and 313 for the cocrystal of Example 17. It was confirmed that the $IC_{50}$ of remdesivir, a positive control drug currently used as a corona therapeutic agent, was 3.48 μM, which was about 21.75-fold higher than the $IC_{50}$ of the cocrystal. In addition, in the case of an AIDS therapeutic agent, lopinavir, which had been noted as a corona therapeutic agent, the $IC_{50}$ was 10.30 μM, which was about 64.38-fold higher than the $IC_{50}$ of the cocrystal of the present invention. In addition, in the case of a malaria therapeutic agent, chloroquine, the $IC_{50}$ was 7.47 μM, which was about 46.69-fold higher than the $IC_{50}$ of the cocrystal of the present invention.

As a result, it was confirmed that the cocrystal of the present invention had a significantly low $IC_{50}$ value and an excellent antiviral effect compared to the drug, remdesivir currently used as a corona therapeutic agent.

In addition, it was confirmed that the cocrystal of the present invention had a significantly high selective index (SI) value for the virus compared to the positive control. The SI is an index showing a ratio of cytotoxicity to the antiviral activity, and the higher the value, the more effective and safe it is. Therefore, it was confirmed that the proliferation of SARS-CoV-2 virus may be selectively inhibited.

The present invention has been described with reference to the preferred embodiments of the present invention, but those skilled in the art will understand that the present invention may be variously modified and changed without departing from the spirit and the scope of the present invention which are defined in the appended claims. Therefore, the substantial scope of the present disclosure will be defined by the appended claims and their equivalents.

The invention claimed is:

1. A pharmaceutical composition for treating one or more cancer selected from the group consisting of pancreatic cancer, breast cancer, non-small cell lung cancer and liver cancer, comprising, as an active ingredient, a cocrystal comprising camostat or a pharmaceutically acceptable salt thereof, and niclosamide,
   (i) wherein a powder X-ray diffraction (XRD) pattern of the cocrystal includes diffraction peaks represented at diffraction angle 2θ (±0.2°) values of 5.37715°, 15.1122°, 18.2258°, 18.7579°, 20.3344°, 25.596° and 26.069°; and wherein when the heating rate is 10° C./min, a differential scanning calorimetry (DSC) endothermic peak of the cocrystal is shown at 144.38±3° C.;

(ii) wherein a powder X-ray diffraction (XRD) pattern of the cocrystal includes diffraction peaks represented at diffraction angle 2θ (±0.2°) values of 6.55954°, 10.7176°, 18.147°, 19.5855°, 21.3591°, and 26.8178°; and wherein when the heating rate is 10° C./min, a differential scanning calorimetry (DSC) endothermic peak of the cocrystal is shown at 126.35±3° C.;

(iii) wherein a powder X-ray diffraction (XRD) pattern of the cocrystal includes diffraction peaks represented at diffraction angle 2θ (±0.2°) values of 11.3876°, 16.0975°, 16.6493°, 18.679°, 23.0539°, 23.9013°, 24.4333°, and 29.7344°; and wherein when the heating rate is 10° C./min, a differential scanning calorimetry (DSC) endothermic peak of the cocrystal is shown at 182.74±3° C.; or (iv) wherein a powder X-ray diffraction (XRD) pattern of the cocrystal includes diffraction peaks represented at diffraction angle 2θ (±0.2°) values of 6.81572°, 7.46604°, 9.87023°, 12.3532°, 13.24°, and 18.6396°; and wherein when the heating rate is 10° C./min, a differential scanning calorimetry (DSC) endothermic peak of cocrystal is shown at 151.69±3° C.

2. The pharmaceutical composition of claim 1, wherein a molar ratio of the camostat or the pharmaceutically acceptable salt thereof and the niclosamide is 1:4 to 4:1.

3. A pharmaceutical composition for treating one or more cancer selected from the group consisting of pancreatic cancer, breast cancer, non-small cell lung cancer and liver cancer, comprising, as an active ingredient, a cocrystal comprising camostat or a pharmaceutically acceptable salt thereof, niclosamide, and a co-former, wherein a powder X-ray diffraction (XRD) pattern of the cocrystal includes diffraction peaks represented at diffraction angle 2θ (±0.2°) values of 7.0522°, 7.6239°, 9.06226°, 12.4912°, 18.009°, and 21.9897°; and wherein when the heating rate is 10° C./min, a differential scanning calorimetry (DSC) endothermic peak of the cocrystal is shown at 126.03° C., and wherein the co-former is at least one selected from meglumine, histidine, arginine, nicotinamide, benzoate, formic acid, sorbic acid, citric acid, malic acid, caffeine, theophylline and urea.

4. The pharmaceutical composition of claim 3, wherein a molar ratio of the camostat or the pharmaceutically acceptable salt thereof, the niclosamide, and the co-former is 1:1:1 to 1:1:6.

5. A method for treating one or more cancer selected from the group consisting of pancreatic cancer, breast cancer, non-small cell lung cancer and liver cancer, comprising administering the pharmaceutical composition according to claim 1 to a subject who has one or more cancer.

6. A method for treating one or more cancer selected from the group consisting of pancreatic cancer, breast cancer, non-small cell lung cancer and liver cancer, comprising administering the pharmaceutical composition according to claim 4 to a subject who has one or more cancer.

7. The method of claim 5, wherein the subject has breast cancer and wherein the breast cancer is selected from the group consisting of hormone-receptor positive breast cancer, HER2-positive breast cancer, triple negative breast cancer, doxorubicin-resistant breast cancer, paclitaxel-resistant breast cancer, and tamoxifen-resistant breast cancer.

8. The method of claim 6, wherein the subject has breast cancer and wherein the breast cancer is selected from the group consisting of hormone-receptor positive breast cancer, HER2-positive breast cancer, triple negative breast cancer, doxorubicin-resistant breast cancer, paclitaxel-resistant breast cancer, and tamoxifen-resistant breast cancer.

* * * * *